United States Patent [19]
Imai et al.

[11] Patent Number: 6,060,851
[45] Date of Patent: May 9, 2000

[54] CONTROL DEVICE CAPABLE OF SUPPLYING SINUSOIDAL POWER TO BRUSHLESS MOTOR OF A WASHING MACHINE

[75] Inventors: Masahiro Imai, Tajimi; Kazunobu Nagai, Aichi-gun; Hiroshi Ikeda; Yoshiyuku Makino, both of Seto, all of Japan

[73] Assignee: Kabushiki Kaisha Toshiba, Kanagawa, Japan

[21] Appl. No.: 09/144,475

[22] Filed: Aug. 31, 1998

[30] Foreign Application Priority Data

Aug. 29, 1997 [JP] Japan ................................. 9-234950

[51] Int. Cl.$^7$ ................................................. H02K 23/00
[52] U.S. Cl. ........................................ 318/437; 312/439
[58] Field of Search ............................. 318/254, 439, 318/138, 437

[56] References Cited

U.S. PATENT DOCUMENTS

| | | | |
|---|---|---|---|
| 4,282,472 | 8/1981 | Martin | 318/696 |
| 4,673,849 | 6/1987 | Sears et al. | 318/272 |
| 4,847,743 | 7/1989 | Kamiyama | 363/41 |
| 5,099,185 | 3/1992 | Kono et al. | 318/799 |
| 5,155,419 | 10/1992 | Naito | 318/254 |
| 5,545,963 | 8/1996 | Aizawa | 318/696 |
| 5,778,703 | 7/1998 | Imai et al. | 68/23.7 |

*Primary Examiner*—Jonathan Salata
*Attorney, Agent, or Firm*—Pillsbury Madison & Sutro LLP

[57] ABSTRACT

A full-automatic washing machine includes an outer tub, a rotatable tub rotatably mounted in the outer tub, an agitator rotatably mounted in the rotatable tub, and a brushless motor for direct driving at least one of the rotatable tub and the agitator. The brushless motor including windings of a plurality of phases and a rotor. Also, the washing machine includes rotor position detecting elements to detect a rotational position of the rotor. The rotor position detecting element are less in number than the phases of the motor. An energizing signal forming element to generate a sinusoidal energizing signal for each of the phases based on the detected rotational position of the rotor. Last, a driving element to energize the windings of the phases based on the energizing signals.

36 Claims, 17 Drawing Sheets

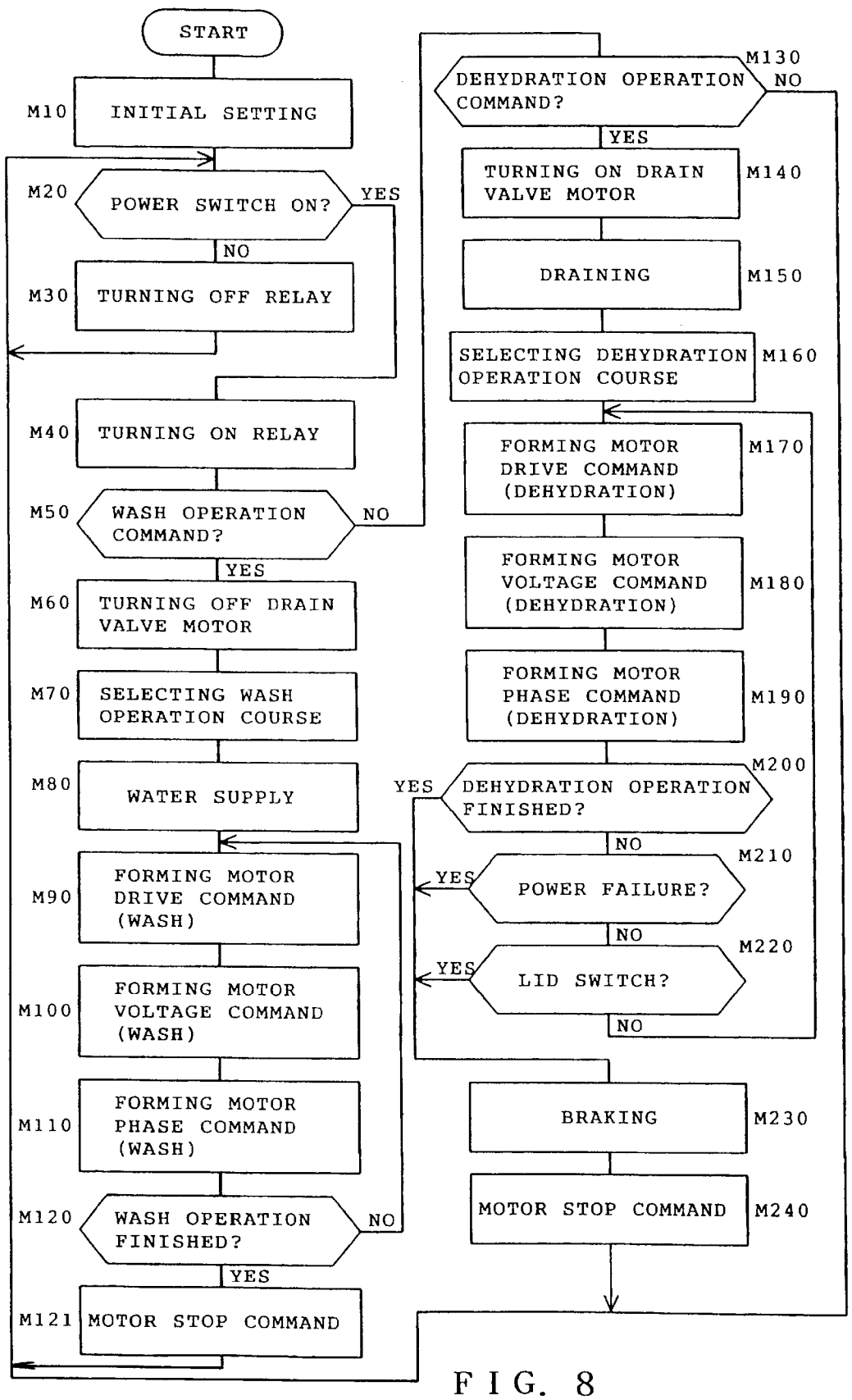
F I G. 8

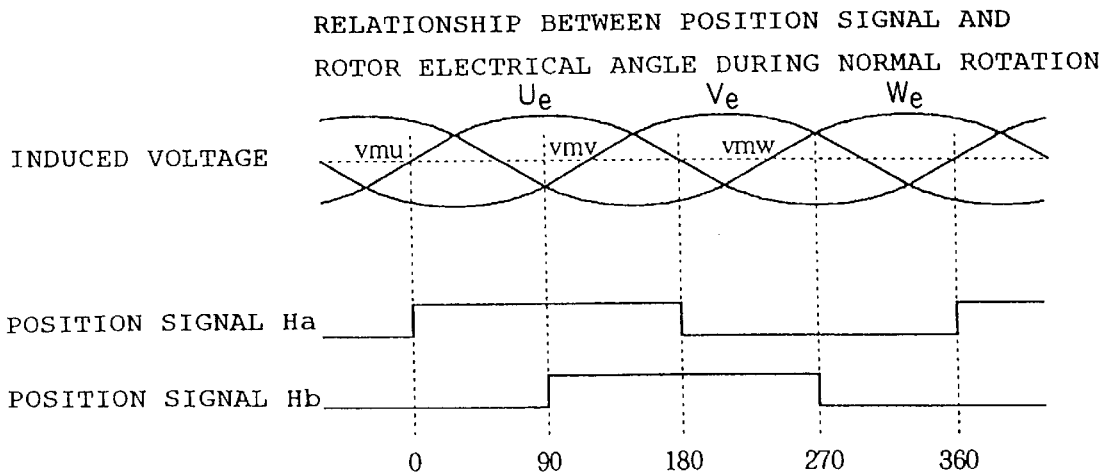
FIG. 13
ELECTRICAL ANGLE $P_e$
| POSITION SIGNAL Ha Hb | INITIAL ELECTRICAL ANGLE DATA TABLE (MIDDLE POINT) | ROTATION ELECTRICAL ANGLE DATA TABLE |
|---|---|---|
| 0 0 | 315 DEGREES | 270 DEGREES |
| 0 1 | 45 | 0 |
| 1 0 | 225 | 180 |
| 1 1 | 135 | 90 |
FIG. 14
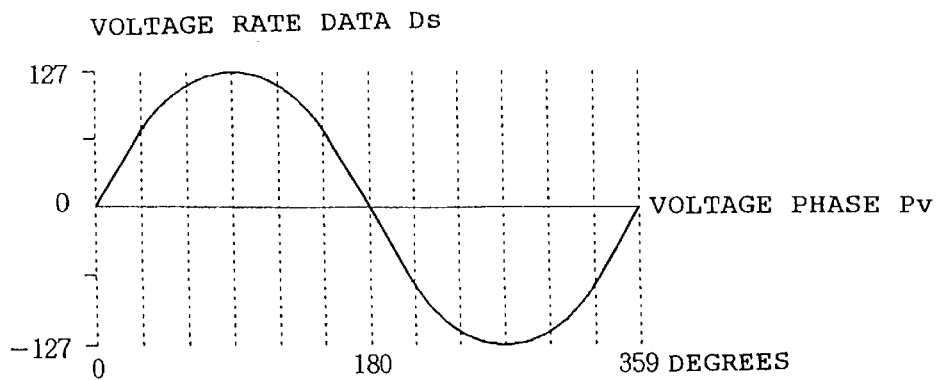
FIG. 15

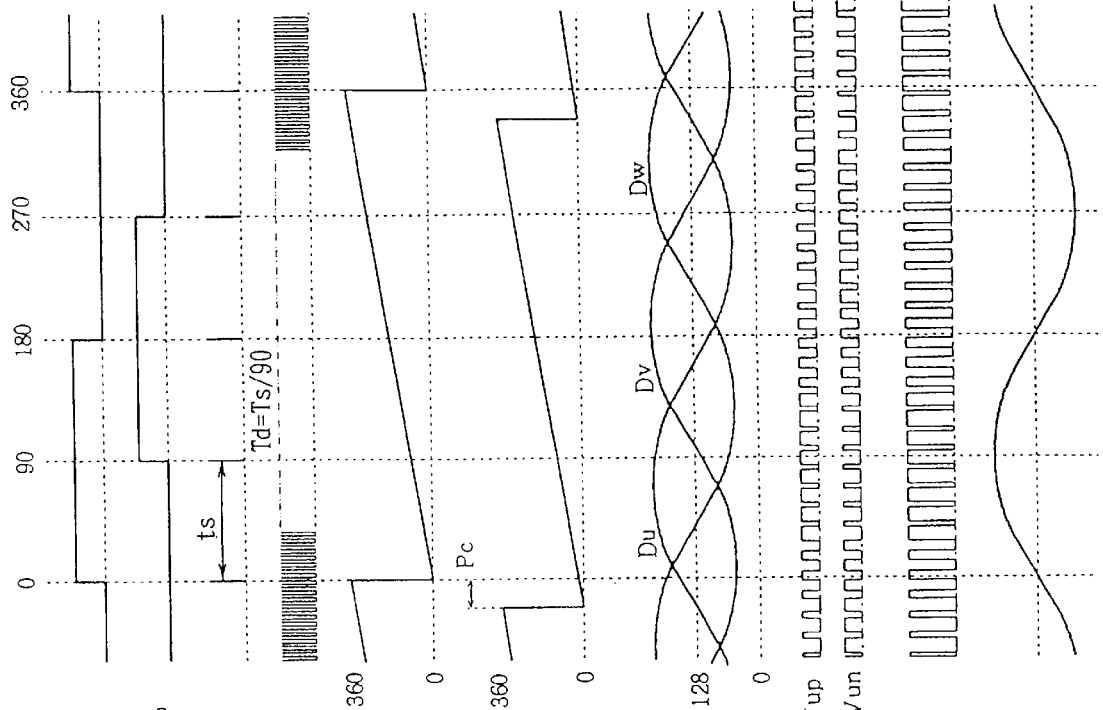
FIG. 16A POSITION SENSOR
FIG. 16B FIRST INTERRUPT PROCESS
FIG. 16C SECOND INTERRUPT PROCESS
FIG. 16D ELECTRICAL ANGLE Pe
FIG. 16E VOLTAGE PHASE Pv
FIG. 16F ENERGIZING WAVEFORM
FIG. 16G DRIVE SIGNAL
FIG. 16H OUTPUT VOLTAGE (PHASE U)
FIG. 16I WINDING CURRENT (PHASE U)

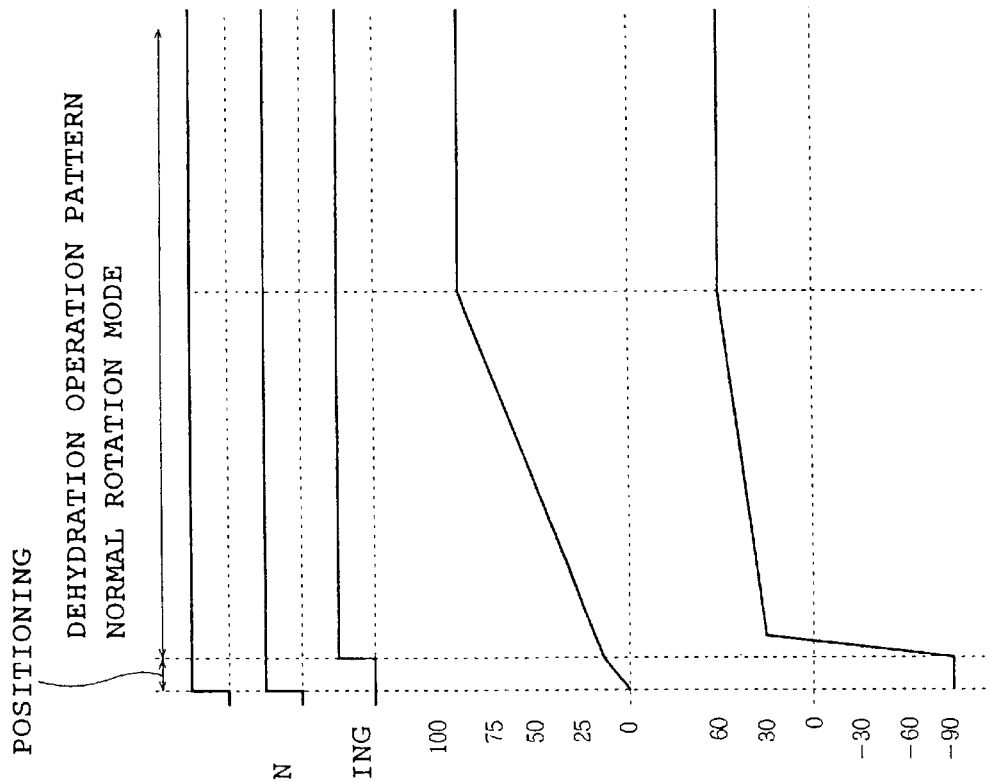
FIG. 17A DRIVE COMMAND DRIVE/STOP
FIG. 17B DRIVE COMMAND ROTATION DIRECTION
FIG. 17C DRIVE COMMAND ROTATION/POSITIONING
FIG. 17D VOLTAGE COMMAND Vc
FIG. 17E PHASE COMMAND Pc

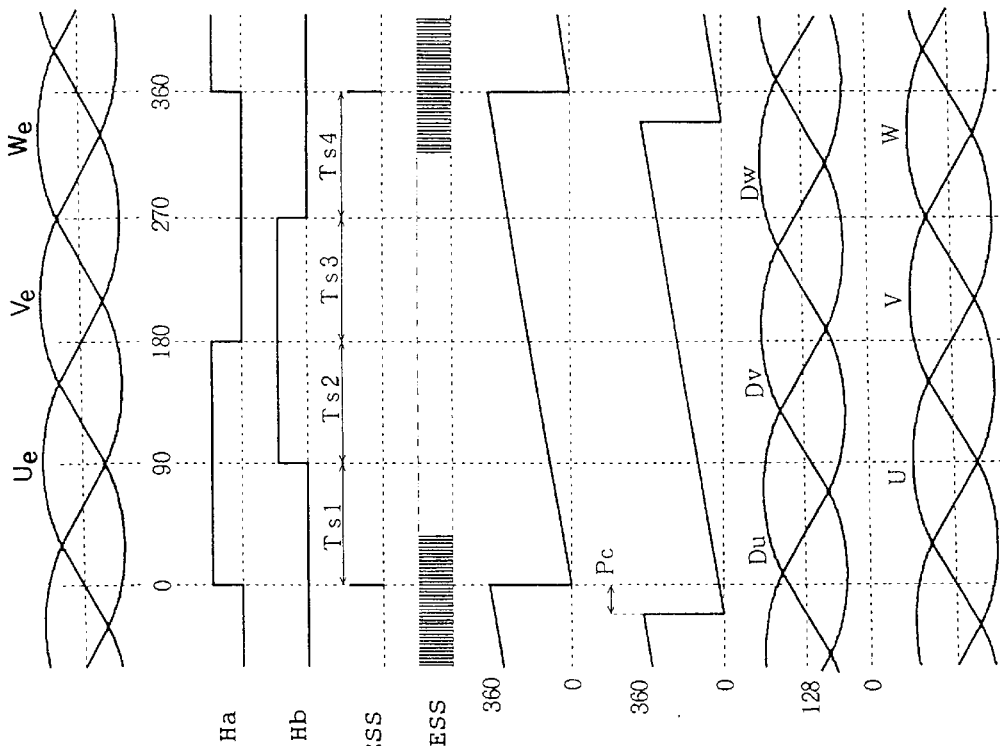
FIG. 18A INDUCED VOLTAGE
FIG. 18B POSITION SENSOR
FIG. 18C FIRST INTERRUPT PROCESS
FIG. 18D SECOND INTERRUPT PROCESS
FIG. 18E ELECTRICAL ANGLE Pe
FIG. 18F VOLTAGE PHASE Pv
FIG. 18G ENERGIZING WAVEFORM
FIG. 18H WINDING CURRENT

CONTROL DEVICE CAPABLE OF SUPPLYING SINUSOIDAL POWER TO BRUSHLESS MOTOR OF A WASHING MACHINE

BACKGROUND OF THE INVENTION

1. Field of the Invention

This invention relates generally to a washing machine; more particularly, to drive control of the motor in such a washing machine.

2. Description of the Prior Art

In washing machines, a rotatable tub serving both as a wash tub and as a dehydration basket is rotatably provided in an outer tub, as is well known in the art. An agitator is rotatably mounted on the bottom of the rotatable tub. The rotatable tub and the agitator are rotated by an electric motor. When a wash operation is executed, a rotational speed of the motor is decreased and the agitator is alternately rotated in normal and reverse directions with the rotatable tub being stopped by a braking force. In execution of a dehydration operation, the rotational speed of the brushless motor is not decreased with the rotatable tub being released from the braked state and both the rotatable tub and the agitator are rotated at high speeds.

To drive the rotatable tub and the agitator as described above, a belt transmission mechanism, a clutch mechanism, a gear reduction mechanism including planetary gears, etc. are provided in a rotation transmission path from the motor to the rotatable tub and the agitator. However, these driving mechanisms increase the weight and the height of the washing machine. Furthermore, the gear reduction mechanism produces loud noise during operation.

Hence, what is needed is an improved drive control that eliminates the need for a belt transmission mechanism and a gear reduction mechanism to reduce the weight and height of the washing machine, and eliminate the noise produced by the gears. In addition, the electric motor used with the drive control needs to produce high torque and its rotational speed needs to be variable in a broad range of speed—from low to high. The torque variations, however, results in vibration of the motor, which produces noise. Accordingly, the noise emanating from the motor should be better controlled.

SUMMARY OF THE INVENTION

An object of the present invention, for example, is to provide a washing machine that produces less vibration and noise; also, to reduce the weight and height of the machine.

In one implementation of the present invention, for example, a washing machine includes an outer tub, a rotatable tub rotatably mounted in the outer tub, an agitator rotatably mounted in the rotatable tub, and a brushless motor for direct driving at least the rotatable tub or the agitator. The brushless motor includes windings of various phases and a rotor. Also, the washing machine includes rotor position detecting elements, which are less in number than the phases of the motor, to detect a rotational position of the rotor. An energizing signal forming element to generate a sinusoidal energizing signal for each of the phases based on the detected rotational position of the rotor. Last, a driving element to energize the windings of the phases based on the energizing signals.

BRIEF DESCRIPTION OF THE DRAWINGS

Other objects, features and advantages of the present invention will become clear upon reviewing the following description of the preferred embodiment thereof, made with reference to the accompanying drawings, in which:

FIG. 8 is a flowchart showing a main process;

FIG. 13 shows the relationship between the position signal and the rotor electrical angle in the form of induced voltage in the normal rotation of the motor;

FIG. 14 shows an electrical angle data table;

FIG. 15 shows the relationship between the voltage phase and the voltage rate data;

FIGS. 16A to 16I show energization of the motor by sinusoidal wave at or below a predetermined speed;

FIGS. 17A to 17E are time charts showing an example of dehydration operation pattern; and FIGS. 18A to 18H show energization of the motor by sinusoidal wave at or above the predetermined speed.

DETAILED DESCRIPTION OF THE PREFERRED EMBODIMENT

Figure 2:
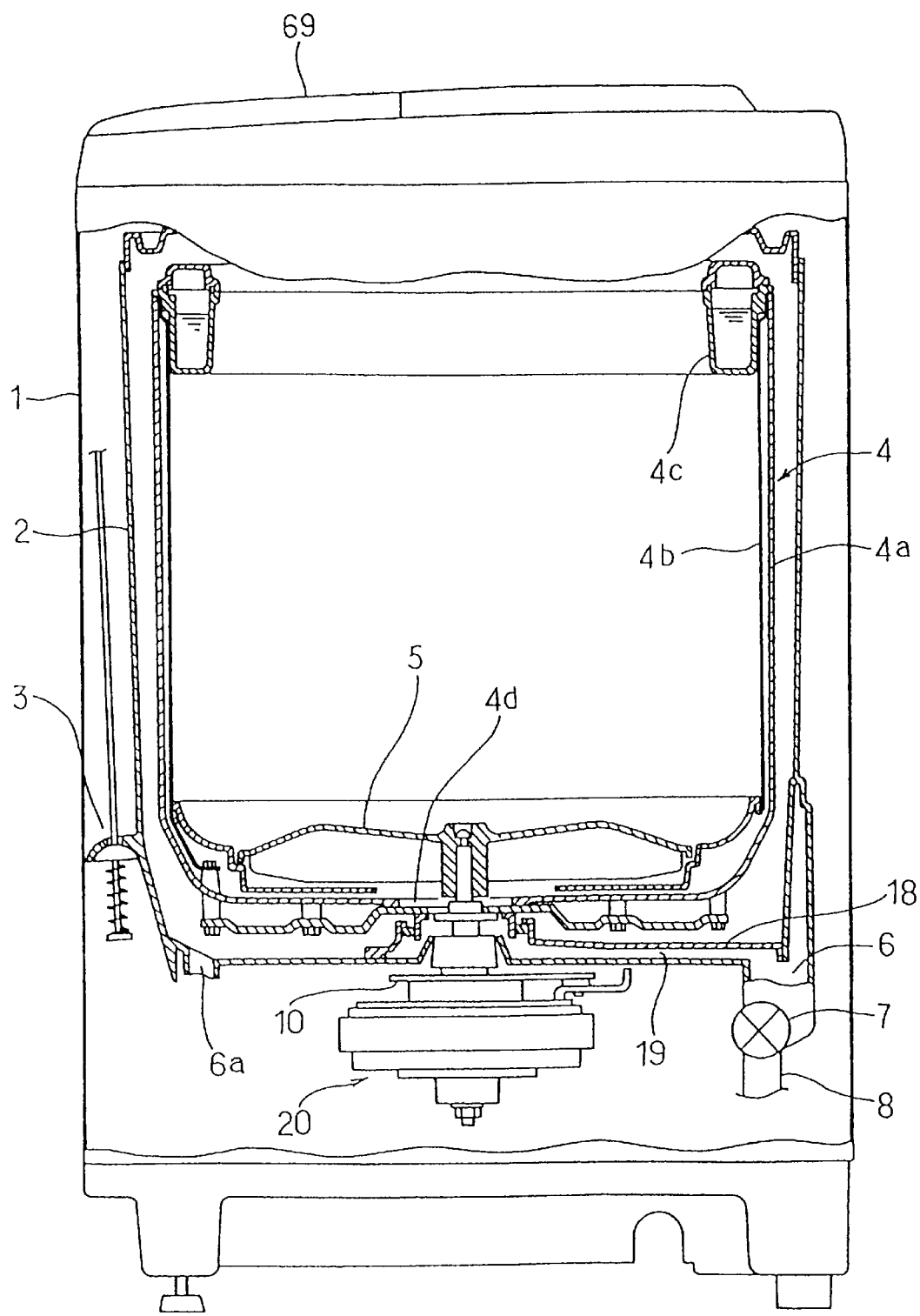
FIG. 2 is a longitudinally sectional side view of the washing machine.

One embodiment of the present invention will now be described with reference to the accompanying drawings. The invention is applied to a full-automatic washing machine in the embodiment. Referring first to FIG. 2, the overall construction of the full-automatic washing machine is shown. The washing machine comprises an outer cabinet 1 enclosing an outer or water-receiving tub 2 receiving water discharged in a dehydration operation. The water-receiving tub 2 is suspended on a plurality of elastic suspension mechanisms 3 one of which is shown. A rotatable tub 4 serving both as a wash tub and as a dehydration basket is rotatably mounted in the water-receiving tub 2. An agitator 5 is rotatably mounted on the bottom of the rotatable tub 4.

The rotatable tub 4 includes a generally cylindrical tub body 4a, an inner cylinder 4b provided inside the tub body 4a to define a water passing space, and a balancing ring 4c mounted on an upper end of the tub body 4a. Upon rotation of the rotatable tub 4, a resultant centrifugal force raises water therein, which is then discharged into the water-receiving tub 2 through dehydration holes (not shown) formed in the upper portion of the tub body 4a.

A drain hole 6 is formed in the right-hand bottom of the water-receiving tub 2, as viewed in FIG. 2. A drain valve 7 is provided in the drain hole 6. A drain hose 8 is connected to the drain hole 6. The drain valve 7 is a motor operated valve closed and opened by a drain valve motor 9 (see FIG. 1B) serving as drain valve driving means which will be described later. The drain valve motor 9 comprises a geared motor, for example. An auxiliary drain hole 6a is formed in the left-hand bottom of the water-receiving tub 2, as viewed in FIG. 2. The auxiliary drain hole 6a is connected through a connecting hose (not shown) to the drain hose 8. The auxiliary drain hole 6a is provided for discharging water which has been discharged through the dehydration holes in the upper portion of the rotatable tub 4 into the water-receiving tub 2 upon rotation of the rotatable tub 4 for the dehydration operation.

Figure 3:
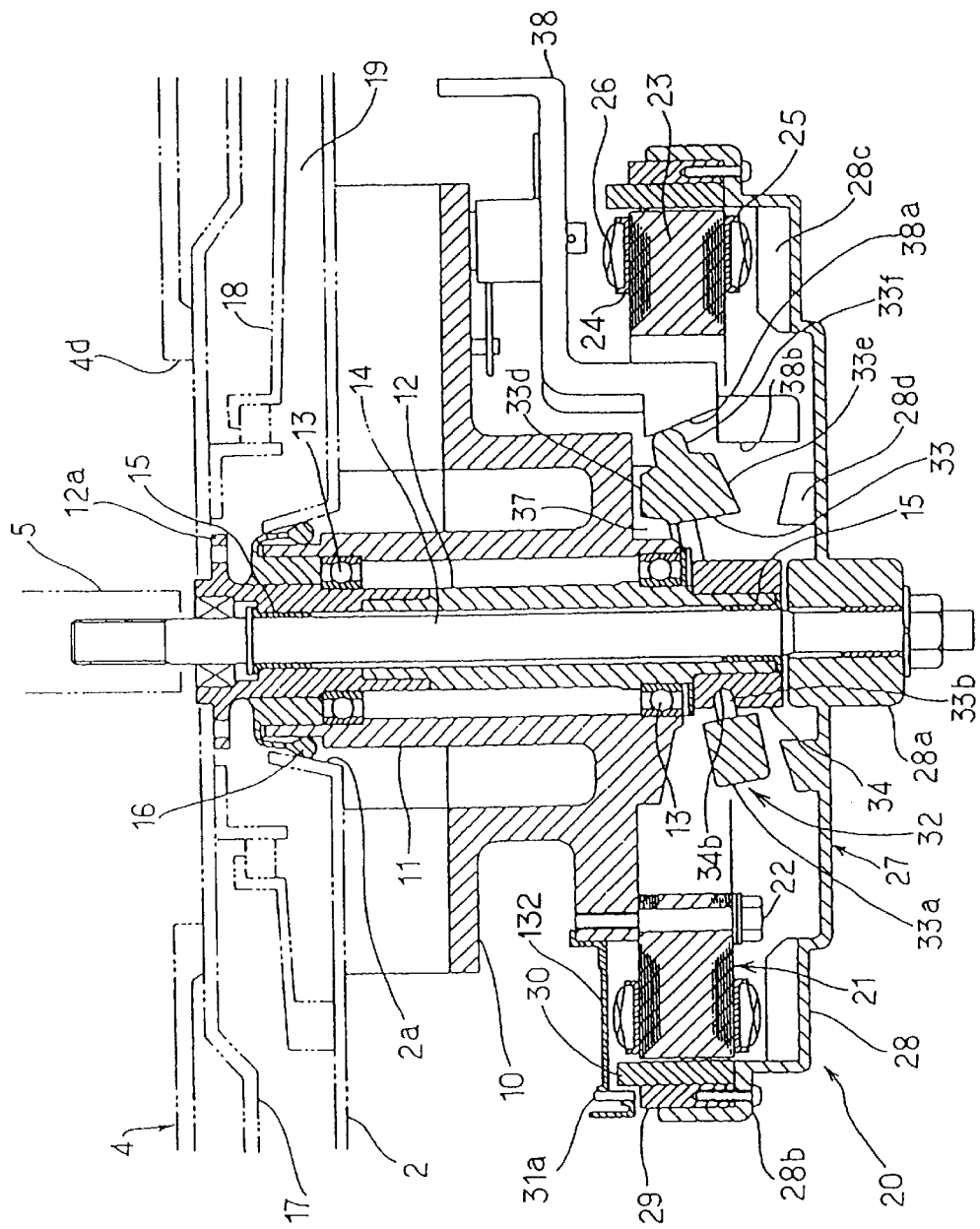
FIG. 3 is a longitudinally sectional side view of the driving mechanism section for the rotatable tub and the agitator.

Referring to FIGS. 2 and 3, a mechanism base 10 is mounted on an outer bottom of the water-receiving tub 2. The mechanism base 10 is formed in its central portion with a vertically extending shaft support cylinder 11. A hollow tub shaft 12 is inserted in the shaft support cylinder 11 to be supported on bearings 13 for rotation. An agitator shaft 14 is inserted in the tub shaft 12 to be supported on bearings 15 for rotation. Upper and lower ends of the agitator shaft 14 extend out of the tub shaft 12.

An upper end of the shaft support cylinder 11 is fitted into a through hole 2a formed in the central bottom of the water-receiving tub 2 with a seal 16 being interposed therebetween for watertight seal. Another seal 16 is provided between an outer circumferential surface of the tub shaft 12 and the upper end of the shaft support cylinder 11 for watertight seal therebetween. The tub shaft 12 has an integrally formed flange 12a on the upper end thereof. The rotatable tub 4 is mounted on a tub support plate 17 further fixed to the flange 12a so that the rotatable tub 4 is coupled via the sleeve 12b with the tub shaft 12 to thereby be rotated with the latter. The upper end of the agitator shaft 14 is fitted into the agitator 5 so that the agitator 5 is fixed by a screw to the agitator shaft 14, whereby the agitator 5 is rotated with the agitator shaft 14, as shown in FIGS. 2 and 3.

A drain cover 18 extends between the central inner bottom of the water-receiving tub 2 and the drain hole 6 to define a draining passage 19 extending from a through hole 4d formed in the bottom of the rotatable tub 4 to the drain hole 6, as shown in FIGS. 2 and 3. In this construction, water is stored in the rotatable tub 4 and the draining passage 19 when supplied into the tub 4 with the drain valve 7 being closed. The water in the rotatable tub 4 is discharged through the hole 4d, the draining passage 19, the drain hole 6, the drain valve 7, and the drain hose 8 sequentially when the drain valve 7 is opened.

Figure 1A:
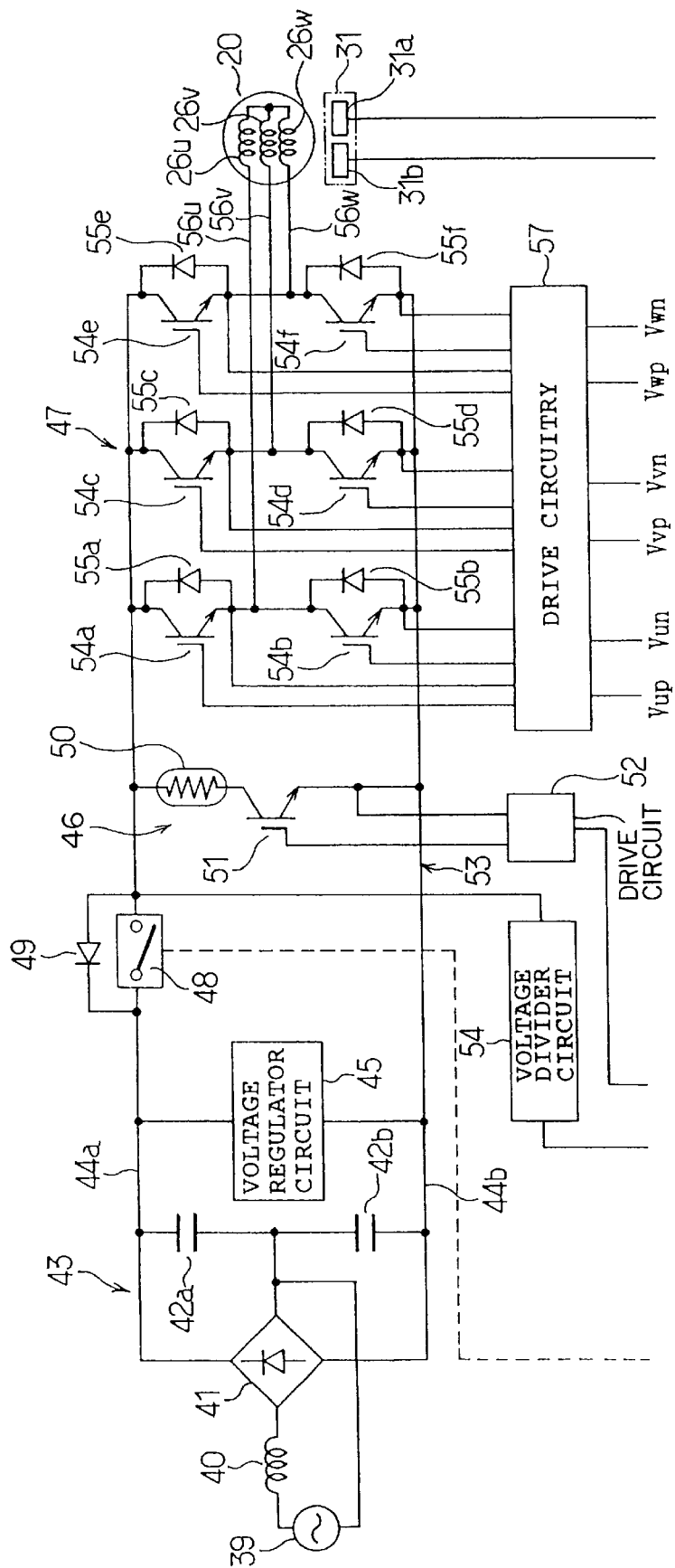
FIGS. 1A and 1B are circuit diagrams showing the electrical arrangement of a full-automatic washing machine of one embodiment in accordance with the present invention.
Figure 4:
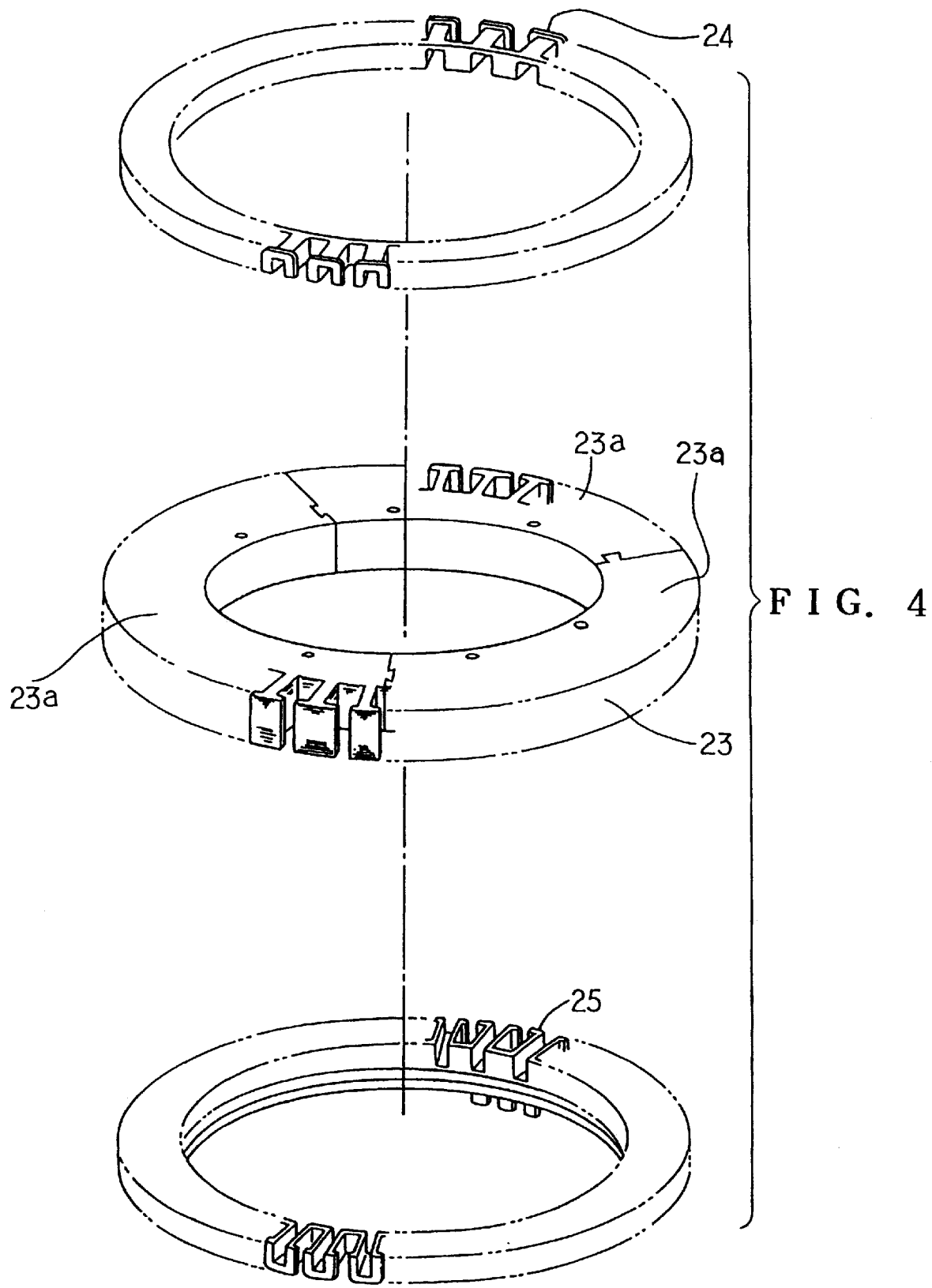
FIG. 4 is an exploded perspective view of the stator of the brushless motor.

An outer rotor type brushless motor 20, for example, is mounted on the mechanism base 10 further mounted on the outer bottom of the water-receiving tub 2. More specifically, a stator 21 of the motor 20 is mounted on the mechanism base 10 by stepped screws 22 to be concentric with the agitator shaft 14, as shown in FIG. 4. The stator 21 comprises a laminated iron core 23, upper and lower bobbins 24 and 25, and a winding 26, as shown in FIG. 3. The laminated core 23 comprises three generally circular arcuate unit iron cores 23a connected to one another into an annular shape, as shown in FIG. 4. The upper and lower bobbins 24 and 25 are each made of a plastic and adapted to be fitted to upper and lower teeth of the laminated core 23 respectively. The winding 26 is wound around the outer peripheries of the bobbins 24 and 25. The winding 26 is composed of three-phase windings 26u, 26v and 26w as shown in FIG. 1A.

A rotor 27 of the brushless motor 20 is mounted on the lower end of the agitator shaft 14 to be rotated therewith, as shown in FIG. 3. The rotor 27 comprises a rotor housing 28, a rotor yoke 29, and a plurality of rotor magnets 30. The rotor housing 28 is made of aluminum by die-casting and has a central boss portion 28a and an outer peripheral magnet mounting portion 28b. The lower end of the agitator shaft 14 is fitted into the boss portion 28a to be fixed in position.

Figure 5:
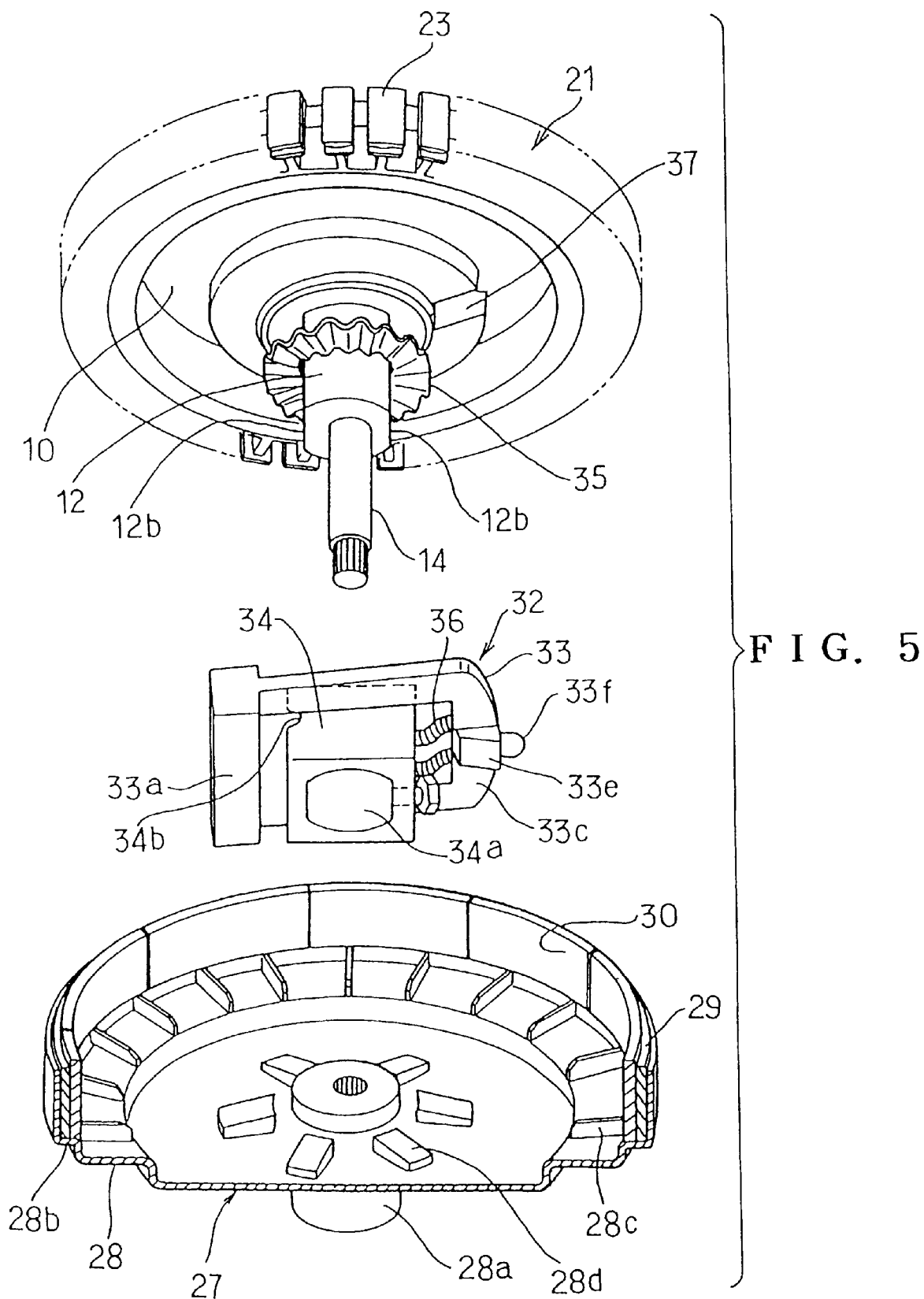
FIG. 5 is an exploded perspective view of the brushless motor and the clutch.

The magnet mounting portion 28b of the rotor housing 28 includes a horizontal portion and a vertical portion. The rotor yoke 29 is abutted against an inner surface of the vertical portion of the magnet mounting portion 28b and further fixed by screws to the horizontal portion of the magnet mounting portion 28b. The rotor magnets 30 are bonded to an inner surface of the rotor yoke 29, for example. The rotor housing 28 has a number of radially extending ribs 28c formed on an upper circumferential surface thereof opposed to the winding 26 of the stator 21, as shown in FIGS. 3 and 5. The rotor housing 28 further has a plurality of convex portions 28d formed on the central bottom thereof to radially protrude about its axis. These convex portions 28d constitute an engaged portion.

Two Hall ICs 31a and 31b, which number is smaller than that of winding phases, are mounted on respective fixtures 132 which are further fixed to the outer periphery of the mechanism base 10, as shown in FIGS. 1 and 3. FIG. 3 shows one 31a of the Hall ICS. The Hall ICs serve as rotor position detecting elements for detecting a rotational position of the rotor magnets 30 of the rotor 27, thereby delivering position signals. The Hall ICs 31a and 31b are disposed so that position signals Ha and Hb delivered from them respectively are changed for every $\pi/2$ in rad (90 degrees), as shown in FIG. 13. Furthermore, the Hall IC 31a is positioned relative to the rotor 27 so as to deliver high-level and low-level digital signals in synchronization with a phase of an induced voltage of phase U. More specifically, the position signal changing to the high level is obtained at a position where the phase U winding 26u and a magnetic pole of the rotor magnets 30 are opposed to each other.

Figure 6:
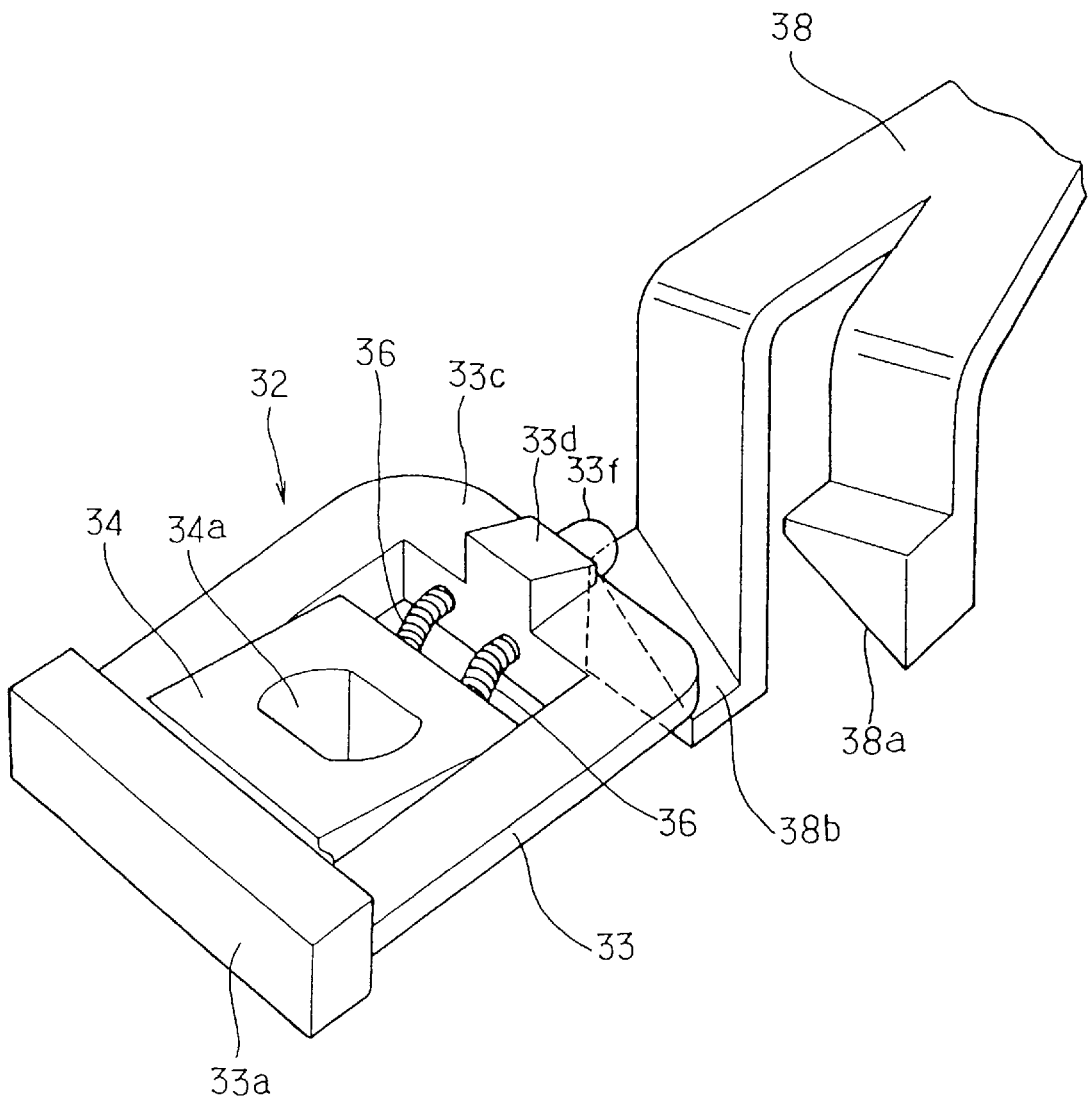
FIG. 6 is a perspective view of the clutch and a control lever.

A clutch 32 is provided on the lower end of the tub shaft 12, as shown in FIGS. 3 and 5. The clutch 32 has a function of switching between a first mode in which the tub shaft 12 is operatively coupled to the agitator shaft 14 in a dehydration operation so that the rotor 27, the agitator shaft 14 and the tub shaft 12 are rotated together, and a second mode in which the tub shaft 12 is decoupled from the agitator shaft 14 in a wash operation so that the tub shaft 12 is prevented from being rotated with the rotor 27 and the agitator shaft The clutch 32 will be described in detail. Referring to FIG. 6, the clutch 30 comprises a generally rectangular frame-shaped change-over lever 33 and a holder 34 provided inside the lever 33. The holder 34 is mounted on the lower end of the tub shaft 12 to be rotated together. More specifically, the tub shaft 12 has a pair of flat faces 12b formed on a lower outer circumferential surface thereof to be opposed to each other, as shown in FIG. 5. The holder 34 has a central fitting hole 34a having flat inner surfaces against which the flat faces 12b of the tub shaft 12 are abutted. The holder 34 further has a pivot concave portion 34b formed in the left-hand outer surface thereof to have an approximately semicircular section, as viewed in FIG. 5. The lower end of the tub shaft 12 is fitted into the fitting hole 34a of the holder 34 and then fixed by screws (not shown) so that the holder 34 is fixed to the tub shaft 12. Furthermore, a corrugated washer 35 is provided between the holder 34 and the lower bearing 13, for example. The corrugated washer 35 is adapted to press the lower bearing 13 upward.

The change-over lever 33 is fitted into the holder 34 so as to be rotated with the holder 34 and the tub shaft 12, as shown in FIGS. 5 and 6. The change-over lever 33 has in the inside of one end 33a thereof (a left-hand end in FIG. 5) a pivot convex portion 33b (see FIG. 3) having an approximately semicircular section. The pivot convex portion 33b is fitted into the pivot concave portion 34b of the holder 34 so that the change-over lever 33 is pivotable or rotatable upward and downward about the portion 33b. Furthermore, two toggle type springs 36 each comprising a compression coil spring are provided between the change-over lever 33 and the holder 34, as shown in FIGS. 5 and 6. The toggle type springs 36 hold the change-over lever 33 at an upper position (see FIG. 2) when the same is rotated upward and at a lower position (see FIG. 7) when the same is rotated downward. The change-over lever 33 has convex portions 33d and 33e formed on the upper and lower portions of an end 33c thereof and an operated portion 33f protruding from an outside surface of the end 33c.

A recess 37 is formed in the underside of the mechanism base 10 serving as a stationary portion so as to be opposed to the upper convex portion 33d of the change-over lever 33, as shown in FIGS. 3 and 5. On one hand, the upper convex portion 33d of the change-over lever 33 is fitted into the recess 37 when the change-over lever 33 is rotated upward, as shown in FIG. 2 showing the condition in the wash operation. Consequently, the tub shaft 12 and accordingly, the rotatable tub 4 are fixed to the mechanism base 10 serving as the stationary portion. The tub shaft 12 is thus decoupled from the agitator shaft 14 so as not to be co-rotated with the latter and the motor rotor 27 when the upper convex portion 33d has been fitted in the recess 37. In this mode, the agitator shaft 14 and the agitator 5 are directly rotated by the brushless motor 20. The agitator shaft 14 and the motor rotor 27 are originally coupled to each other to be rotated together.

Figure 7:
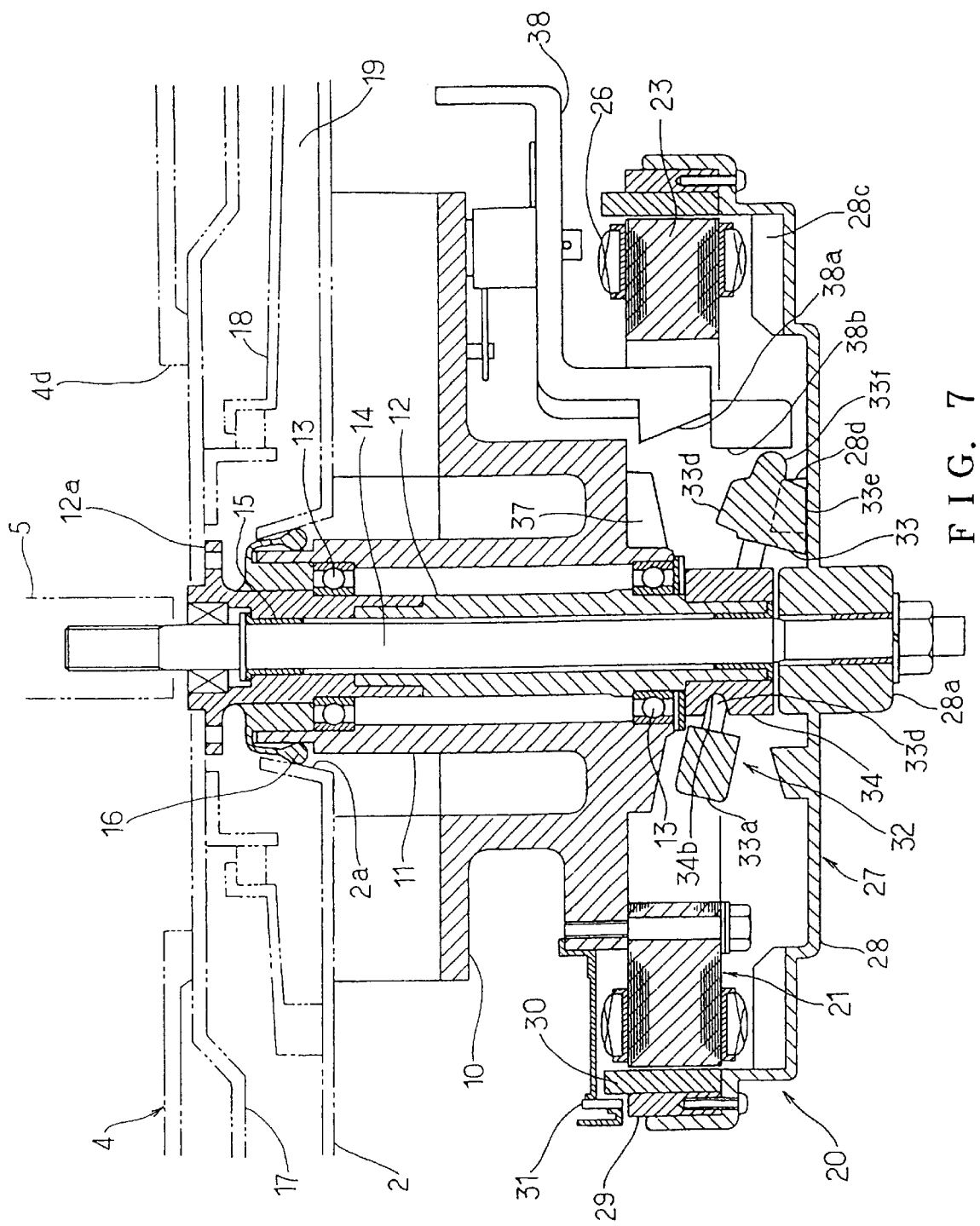
FIG. 7 is a view similar to FIG. 3, showing the state of the clutch differing from that in FIG. 3.

On the other hand, the lower convex portion 33e of the change-over lever 33 engages two of the convex portions 28d on the upper face of the rotor housing 28 when the change-over lever 33 is rotated downward, as shown in FIG. 7 showing the condition in the dehydration operation. Consequently, the tub shaft 12 is co-rotated with the motor rotor 27 and the agitator shaft 14. In this condition, the tub shaft 12, the rotatable tub 4, the agitator shaft 14 and the agitator 5 are directly driven by the brushless motor 20. Thus, the brushless motor 20 directly drives only the agitator 5 or both of the agitator 5 and the rotatable tub 4 together.

A control lever 38 is mounted at its one end on the right-hand end of the mechanism base 10 to be pivotable, as viewed in FIG. 3. The control lever 38 has bifurcated portions at the other end thereof as shown in FIG. 6. One of the bifurcated portions of the lever 38, which is a right-hand one in FIG. 6, has a downwardly inclined surface 38a on its distal end, whereas the other bifurcated portion thereof, which is a left-hand one in FIG. 6, has an upwardly inclined surface 38b on its distal end. The operated portion 33f of the change-over lever 33 of the clutch 32 is pushed downward by the downwardly inclined surface 38a of the control lever 38 when the drain valve motor 9 driving the drain valve 7 causes the control lever 38 to pivot in a direction. Consequently, the change-over lever 33 is rotated downward into the condition of FIG. 7 during the dehydration operation with the drain valve 7 being opened.

A return spring (not shown) of the drain valve 7 causes the control lever 38 to pivot in the opposite direction when the drain valve motor 9 is deenergized under the condition as shown in FIG. 2. Consequently, the operated portion 33f of the change-over lever 33 is upwardly pushed by the upwardly inclined surface 38b of the control lever 38 such that the change-over lever 33 is rotated upward into the condition of FIG. 2 during the wash operation with the drain valve 7 being closed.

Figure 1B:
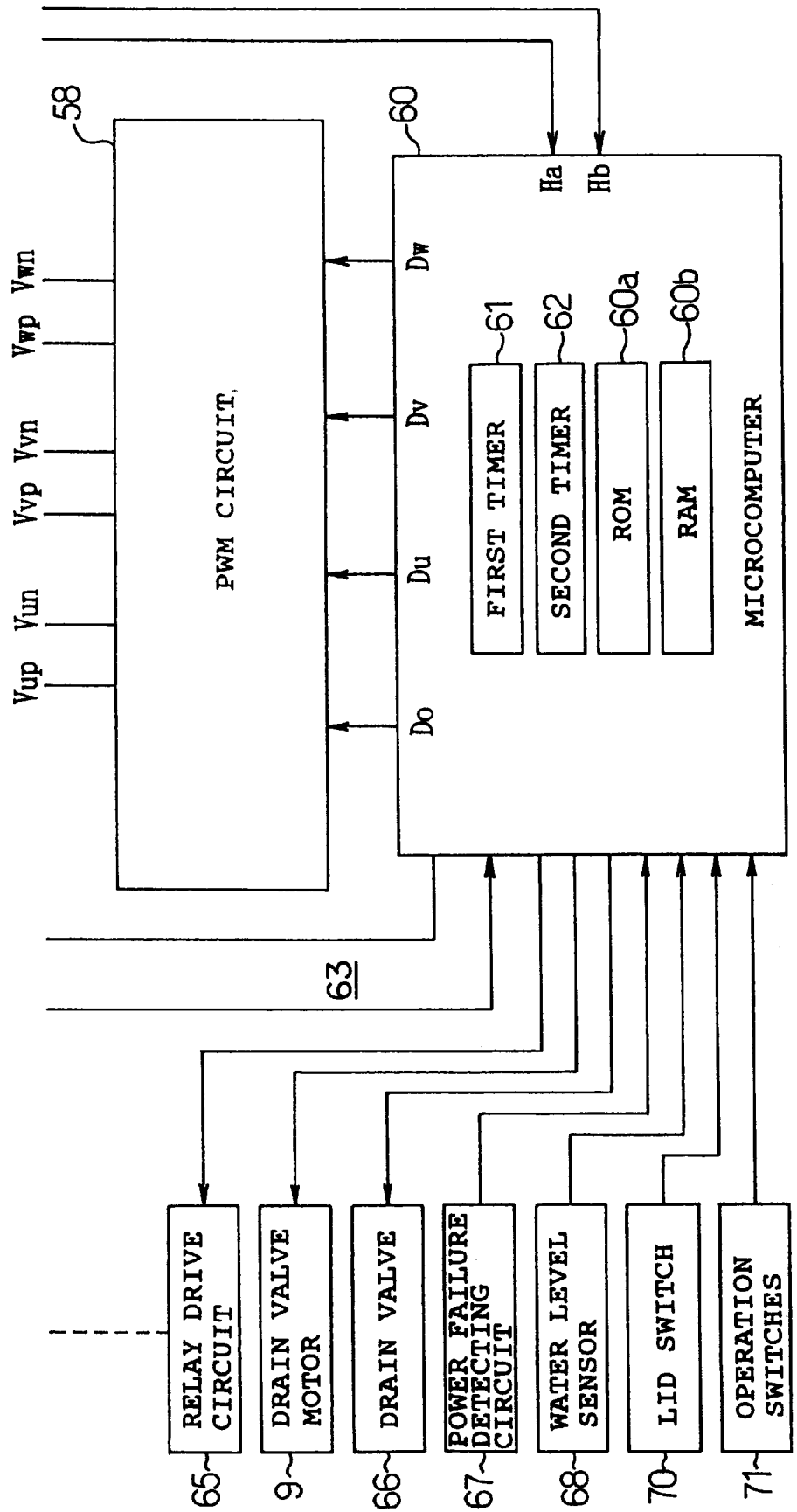

An electrical arrangement of the full-automatic washing machine will now be described with reference to FIGS. 1A and 1B. one of two terminals of a commercial AC power supply 39 is connected through a reactor 40 to an input terminal of a full-wave rectifier circuit 41. The other terminal of the power supply 39 is connected directly to another input terminal of the full-wave rectifier circuit 41. Smoothing capacitors 42a and 42b are connected between output terminals of the full-wave rectifier circuit 41. A DC power supply circuit 43 is composed of the full-wave rectifier circuit 41 and the smoothing capacitors 42a and 42b.

DC bus bars 44a and 44b extend from output terminals of the DC power supply circuit 43. A voltage regulator circuit 45, a discharge circuit 46 and an inverter main circuit 47 are connected between the DC bus bars 44a and 44b. A relay 48 and a diode 49 having the polarity as shown in FIG. 1A are connected in parallel with each other across the bus bar 44a between the voltage regulator circuit 45 and the discharge circuit 46. The discharge circuit 46 is composed of a series connection of a discharge resistance 50 and such as an insulated gate bipolar transistor (IGBT) and a switching element 51. The switching element 51 has a control terminal (gate terminal) connected to a drive circuit 52 comprising a photo-coupler, for example. The discharge circuit 46 and the drive circuit 52 constitute discharging means.

The inverter main circuit 47 comprises three-phase bridge-connected switching elements 54a to 54f comprising respective IGBTs and free-wheel diodes 55a to 55f connected in parallel to the respective switching elements 54a to 54f. The inverter main circuit 47 has output terminals 56u, 56v and 56w connected to the three-phase windings 26u, 26v and 26w of the brushless motor 20 respectively. The switching elements 54a to 54f of the inverter main circuit 47 include control terminals or gates connected to drive circuitry 57 composed of photo-couplers, for example. The drive circuitry 57 is controlled by signals delivered from a PWM circuit 58 to thereby on-off control the switching elements 54a to 54f. The inverter main circuit 47, the drive circuitry 57, and the PWM circuit 58 constitute driving means 59 in the invention.

The PWM circuit 58 is provided with means for generating a triangular wave signal having a predetermined frequency. The PWM circuit 58 compares energizing signals DU, DV and DW supplied thereto from a microcomputer 60 with the triangular wave signal. The results of comparison or drive signals Vup, Vun and Vvp, Vvn, Vwp, and Vwn are delivered to the drive circuitry 57. FIG. 16G shows the drive signals Vup and Vun.

The position signals Ha and Hb delivered from the respective Hall ICs 31a and 31b of the brushless motor 20 are supplied to the microcomputer 60. The microcomputer 60 has a function of controlling the brushless motor 20 and a function of controlling the overall operation of the washing machine. The microcomputer 60 is provided with a ROM 60a for storing control programs for accomplishment of the above-described functions and data required for execution of these control programs. The microcomputer 60 further incorporates a random access memory (RAM) 60b serving as a working storage. The microcomputer 60, for example, serves as an energizing signal forming element, a first energizing forming element, a second energizing signal forming element, a changing period measuring element, a voltage phase determining element, an electrical angle determining element, a phase command determining element, a selector, a rotation energizing signal forming element, a positioning energizing signal forming element, a motor operation selecting element, a phase command forming element, and a voltage command forming element as will be described later.

The microcomputer 60 has two timers 61 and 62 comprising 16 bit counters respectively, for example. Based on the position signals delivered by the two Hall ICs 31a and 31b, the microcomputer 60 forms output waveform data Du, Dv and Dw serving as three-phase sinusoidal energizing signals respectively. The output waveform data Du, Dv and Dw are delivered to the PWM circuit 58. The microcomputer 60 further delivers a signal D0 for permission and stop of output to the PWM circuit 58. The above-described driving means 59, the microcomputer 60, the discharge means 53 and the DC power supply circuit 43 constitute an inverter device 63.

The microcomputer 60 detects via a voltage divider circuit 64 a voltage value at the DC bus bar 44a. A voltage signal delivered by the voltage divider circuit 64 is supplied to an input terminal of the microcomputer 60 having an analog-to-digital (A/D) conversion function. The microcomputer 60 further on-off controls a relay 48 via a relay drive circuit 65. The microcomputer 60 further controls the drain valve motor 9 driving the drain valve 7 and a water-supply valve 66 for supplying water into the rotatable tub 4.

Furthermore, the microcomputer 60 is supplied with a power failure signal from a power failure detecting circuit 67 detecting power failure on the basis of the voltage of the AC power supply 39, a water level signal from a water level sensor 68 for detecting water level in the rotatable tub 4, a lid signal from a lid switch 70 for detecting the opening and closure of a lid 69 (see FIG. 2) provided on the top of the outer cabinet 1, switch signals from various operation switches provided in an operation panel (not shown).

Figure 9:
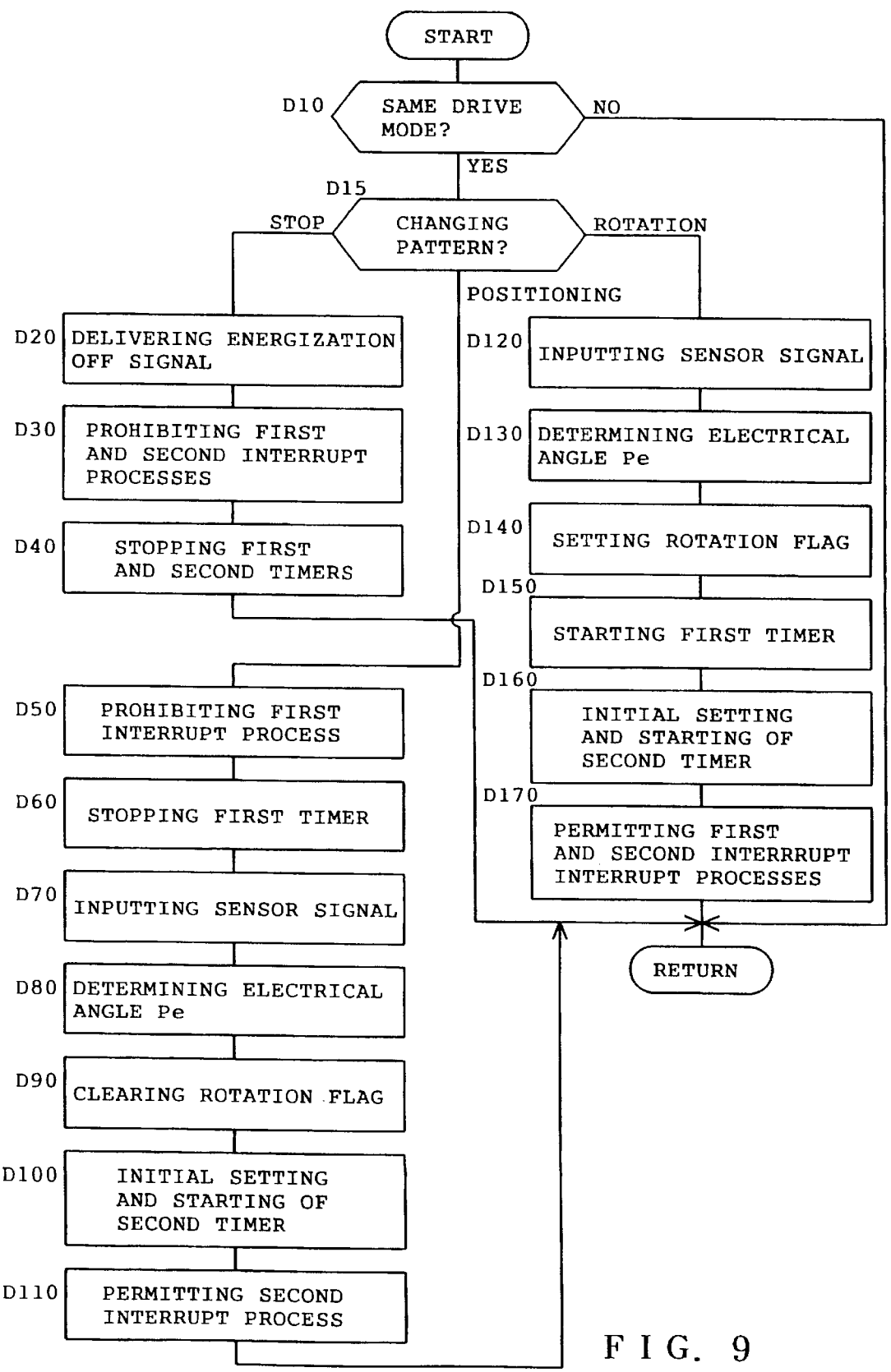
FIG. 9 is a flowchart showing a main process for motor control.
Figure 10:
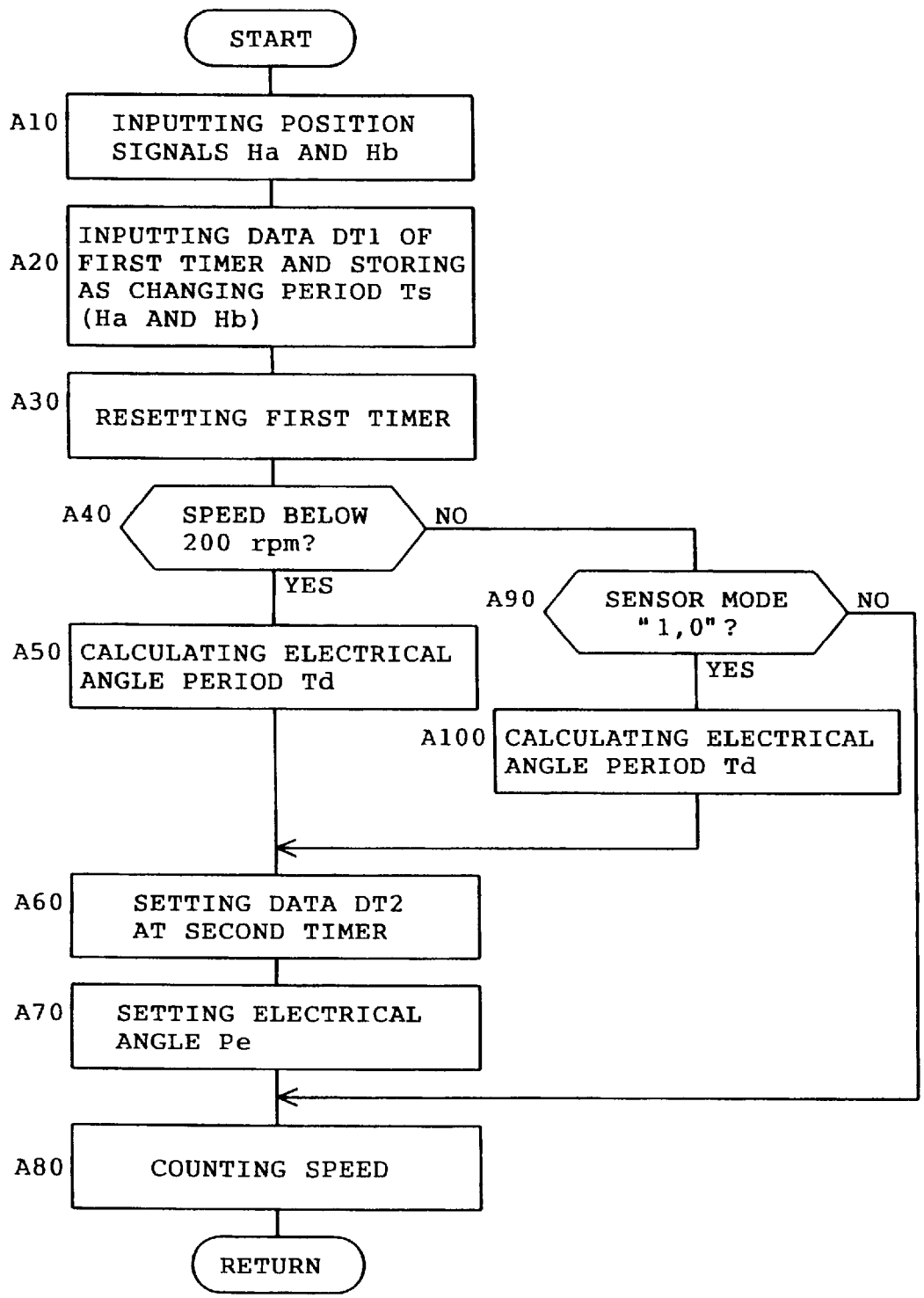
FIG. 10 is a flowchart for a first interrupt routine.
Figure 11:
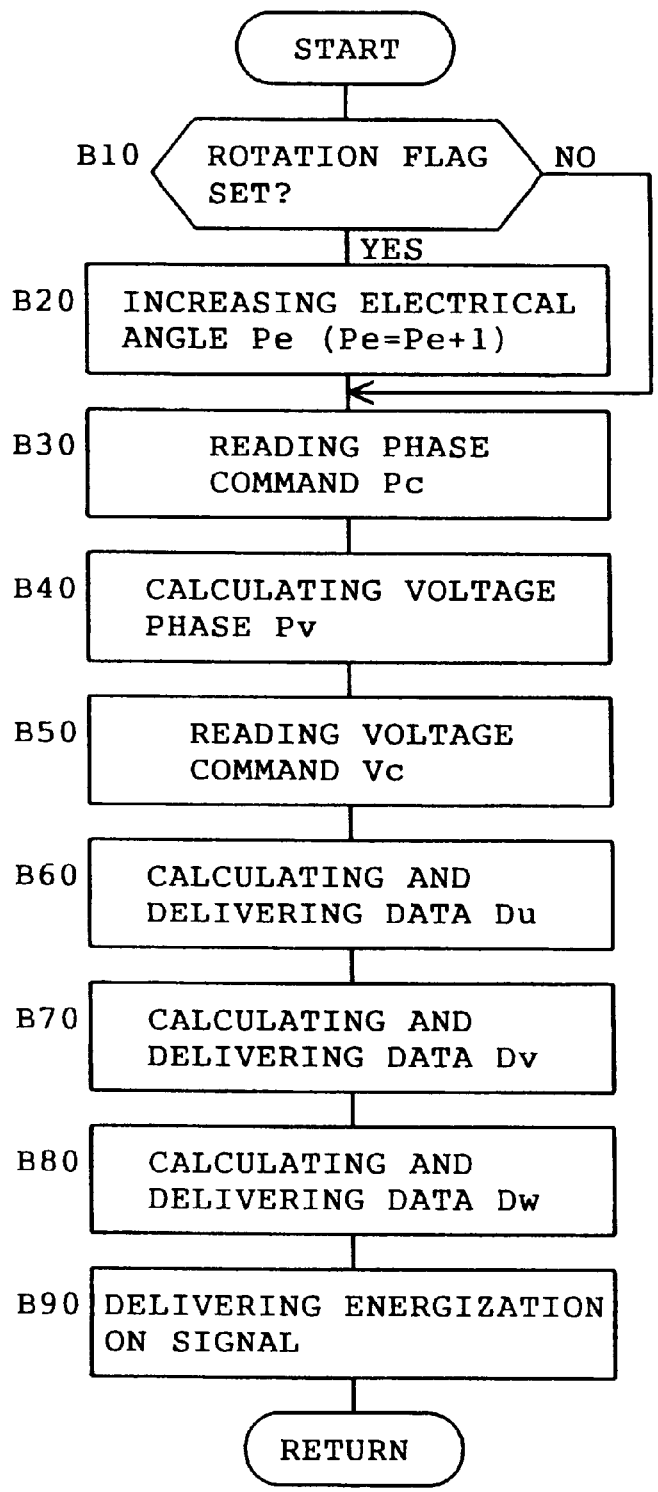
FIG. 11 is a flowchart for a second interrupt routine.
Figure 12:
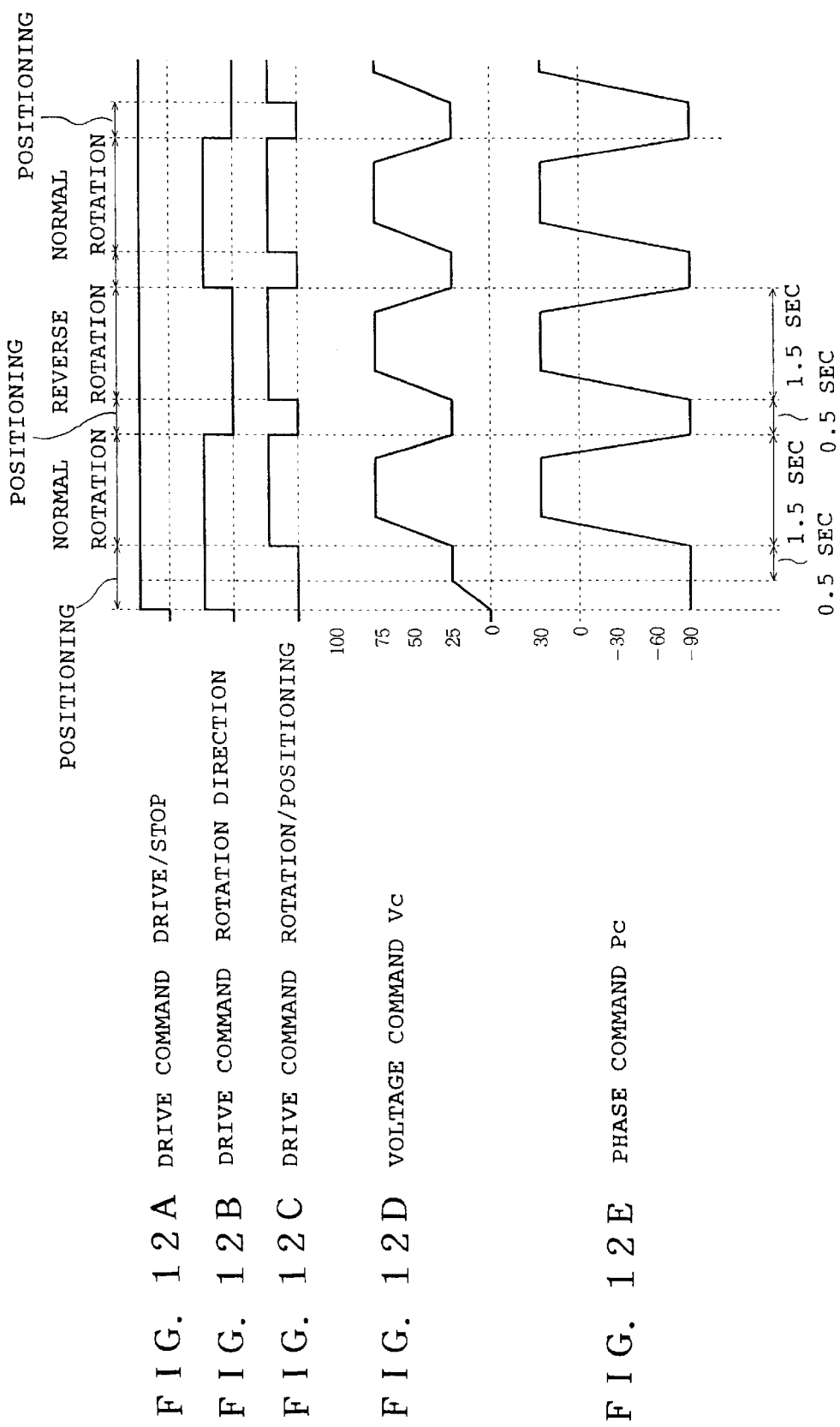
FIGS. 12A to 12E are time charts showing an example of wash operation pattern.

The operation of the washing machine, and more particularly, control manners in the wash and dehydration operations will now be described with reference to FIGS. 8 to 15. FIGS. 8 to 11 show control contents of the control programs stored in the microcomputer 60. FIG. 8 shows the control contents of the main process for the wash and dehydration operations. FIG. 9 shows the control contents of a main process for driving the motor. FIG. 10 shows the control contents of a first interrupt process which is executed on the basis of changes in the levels of the position signals from the Hall ICs 31a and 31b respectively. FIG. 11 shows the control contents of a second interrupt process which is executed every time the second timer 62 counts the time data DT2 as will be described later.

The control for the wash operation will first be described. The process for an initial setting is first executed at step M10 of FIG. 8 when the AC power supply 39 becomes a normal output state. In this process, the RAM 60b is initialized and various output terminals are set at respective initial values. The microcomputer 60 then determines whether a power switch of the operation switches 71 is turned on (step M20). When the power switch is turned off, the microcomputer 60 determines in the negative (NO at step M20), delivering an OFF signal to the relay drive circuit 65 to turn off the relay 48 (step M30). The microcomputer 60 then returns to step M20.

On the other hand, when the power switch is turned on, the microcomputer 60 determines in the affirmative (YES at step M20), delivering an ON signal to the relay drive circuit 65 to thereby turn on the relay 48 (step M40). The microcomputer 60 then determines whether a washing operation command has been delivered (step M50). This determination is based on operations of the operations switches 71. When the washing operation command has been delivered, the microcomputer 60 determines in the affirmative (YES at step M50), delivering a signal to turn off the drain valve motor 9 (step M60). Consequently, the drain valve motor 9 is turned off and the drain valve 7 is closed. Furthermore, the change-over lever 33 of the clutch 32 is rotated upward so that the tub shaft 12 and the rotatable tub 4 are engaged with the mechanism base 10 serving as the stationary member, as shown in FIG. 3. The microcomputer 60 then advances to step M70 where one of a plurality of washing courses is selected to be set. Selection of the one washing course is based on the results of operation of the operation switches 71. The microcomputer 60 then advances to step M80 for execution of process to supply water to the rotatable tub 4. More specifically, the water-supply valve 66 is energized to be opened so that water supply to the rotatable tub 4 is initiated. The water-supply valve 66 is deenergized to be closed when the water-level sensor 68 detects attainment of the water in the tub 4 to a level corresponding to the selected washing course.

The microcomputer 60 then executes a sequential process at steps M90, M100 and M110 to thereby form an operation pattern (operation command) for the brushless motor 20. More specifically, ROM 60a stores data of a plurality of washing operation patterns. The microcomputer 60 reads out one of the washing operation patterns corresponding to the selected washing course, forming a washing operation pattern. FIGS. 12A to 12E show such a washing operation pattern. The washing operation pattern is constituted by a drive command comprising 3 bit data, a voltage command Vc comprising 8 bit data, and a phase command Pc comprising 9 bit data, for example. The drive command is data for DRIVE/STOP, NORMAL ROTATION/REVERSE ROTATION and ROTATION/POSITIONING of the brushless motor 20. DRIVE is represented by the lowest order bit when it is "1." STOP is represented by the lowest order bit when it is "0." NORMAL ROTATION is represented by the middle order bit when it is "1." REVERSE ROTATION is represented by the middle order bit when it is "0." ROTATION is represented by the highest order bit when it is "1." POSITIONING is represented by the highest order bit when it is "0." The voltage command Vc represents a voltage applied to the brushless motor 20. It is data of a sinusoidal wave represented as an ON duty ratio of the switching elements of the inverter main circuit 47. The phase command Pc represents a voltage phase (deg) relative to a rotor phase or rotor position of the brushless motor 20 and is shown as a range between −180 and 179 degrees, as shown in. FIG. 16E.

The washing operation pattern as shown in FIGS. 12A to 12E is executed in a cycle of four seconds and contains NORMAL ROTATION for 1.5 sec., STOP for 0.5 sec., REVERSE ROTATION for 1.5 sec. and STOP for 0.5 sec. The washing operation pattern is repeatedly executed in the washing operation. The washing operation pattern is constituted by the three command data sampled for 20 msec. When the three command data constitute a set of data, the above-described operation pattern executed in the cycle of four seconds is constituted by 200 sets of data. These 200 sets of data are stored in ROM 60a as the washing operation pattern of FIGS. 12A to 12E.

The microcomputer 60 sequentially reads out one set of data or the three command data from ROM 60a at the interval of 20 sec. at steps M90, M100 and M110. The three command data thus read out are formed into a motor drive command, a motor voltage command Vc and motor phase command Pc at steps M90, M100 and M110, respectively. The microcomputer 60 then determines whether the washing operation has been completed (step M120). When determining in the negative (NO at step M120), the microcomputer 60 returns to step M90, where the formation of the three command data is repeated. On the other hand, when the washing operation has been completed, the microcomputer 60 determines in the affirmative (YES at step M120), delivering a motor stop command or changing the signal D0 to the low level to thereby deenergize the brushless motor 20, whereby the washing operation is completed (step M121). Subsequently, the microcomputer 60 returns to step M20. The determination of completion of the washing operation depends upon whether a washing operation time set according to the selected course has expired.

An actual energization of the brushless motor 20 is executed in the main process for driving the motor as shown in FIG. 9, a first interrupt process as shown in FIG. 10, and a second interrupt process as shown in FIG. 11. Each process will now be described. First, the main process for motor drive is executed, for example, at the interval of 20 msec. simultaneously or in parallel with a main process shown in FIG. 8. That is, the main process for the motor drive as shown in FIG. 9 is an interrupt process executed at the interval of 20 msec.

In the motor drive main process, the microcomputer 60 determines at step D10 whether a drive mode based on a motor drive command formed at step M90 in FIG. 8 is the same as a previous one before 20 msec. When determining that the drive mode is the same as the previous one, the microcomputer 60 does not execute the motor drive main process. When determining that the drive mode has changed, the microcomputer 60 advances to step D15 to determine whether the previous drive mode has changed to a stop mode, a positioning mode, or a rotation mode. When determining that the previous drive mode has changed to the stop mode, the microcomputer 60 advances to step D20 to deliver an energization OFF signal and change the signal D0 supplied to the PWM circuit 58 to the low level. Thus, the PWM circuit 58 is turned off and the drive circuitry 57 turns off all the switching elements 54a to 54f of the inverter main circuit 47. As a result, the motor 20 is deenergized. Subsequently, the microcomputer 60 prohibits the first and second interrupt processes (step D30) and stops the first and second timers 61 and 62 (step D40).

When the wash operation program delivers a command for start of the normal and reverse rotations of the motor 20 for driving the agitator 5, the 3 bit code of the drive command in FIGS. 12A to 12C is represented as "110" (DRIVE, NORMAL ROTATION, POSITIONING) such that the operation mode has been changed to a positioning mode. The microcomputer 60 then advances from step D15 to step D50 to prohibit the first interrupt process and further advances to step D60 to stop the first timer 61. The microcomputer 60 further advances to step D70 to input the position signals Ha and Hb from the respective Hall ICs 31a and 31b. The microcomputer 60 then determines an electrical angle Pe (step D80). The electrical angle Pe sequentially increases from an initial value by every predetermined angle or in a predetermined increasing cycle in a range of phase angle of sinusoidal voltage between 0 and 360 degrees. The initial value of the electrical angle Pe is determined on the basis of an initial electrical angle data table of FIG. 14. In the data table of FIG. 14, the initial electrical angle table is used before an initial position signal is supplied in the NORMAL ROTATION mode when the operation is in the POSITIONING mode. A rotation electrical angle table is used after the initial position signal has been supplied in the NORMAL ROTATION mode. FIG. 13 show the relationship between the position signal and the rotor electrical angle during the NORMAL ROTATION. In this case, the rotor position is represented by the induced voltage. The electrical angle is determined on the basis of phase U, V and W induced voltages Ue, Ve and We. Accordingly, the rotation electrical angle table of FIG. 14 is a data table of the position signal and the rotor position electrical angle during the forward rotation of the motor. The initial electrical angle table is a data table of an electrical angle of a middle point in a range defined by the position signals Ha and Hb, that is, electrical angles, "45 degrees," "135 degrees," "225 degrees" and "315 degrees" of the middle points of the ranges, "0 to 90 degrees," "90 to 180 degrees," "180 to 270 degrees," and "270 to 360 degrees" respectively.

The microcomputer 60 then advances to step D90 to clear a rotation flag. The rotation flag is provided for discriminating between ROTATION and POSITIONING and used in the second interrupt process. At step D100, the microcomputer 60 initializes and starts the second timer 62. The microcomputer 60 then advances to step D110 to permit the second interrupt process. The second timer 62 is periodically operated according to the data DT2 so that the second interrupt process is executed.

The second interrupt process will now be described with reference to FIG. 11. First, the microcomputer 60 discriminates the rotation flag (step B10). In this case, since the rotation flag has been cleared at step D90, the microcomputer 60 advances to step B30 to input the phase command Pc and advances to step B40 to obtain a phase angle of the sinusoidal voltage (herein after, "voltage phase") by calculation. The calculation is carried out by the following equation:

$$Pv=Pe+(PC+180) \text{ (rad)}$$

where Pv=Pv−360 when Pv≧360. Since the phase command Pc is given as a range between −180 and 179 degrees, "180" is added to the phase command Pc.

The microcomputer 60 then inputs the voltage command Vc at step B50, and obtains by calculation and delivers the energizing signal Du at step B60. In this case, the microcomputer 60 reads a sinusoidal waveform voltage rate Ds from energizing waveform data corresponding to the obtained voltage phase Pv, as shown in FIG. 15. The energizing signal Du is obtained from the following equation:

$$Du=Ds\times(Vc/256)+128$$

where the voltage rate refers to a ratio of the maximum amplitude value for every phase angle 90 degrees of the sinusoidal to the maximum amplitude value for another phase angle. In the embodiment, an offset value "128" is added since the voltage rate Ds is stored as a range of maximum values between −127 and 127. Furthermore, the amplitude of the energizing signal Du corresponding to the voltage command can be obtained by the multiplication of "Vc/256."

The microcomputer 60 then advances to step B70 to obtain the phase V energizing signal Dv by calculation and deliver the obtained signal. The phase V voltage phase Pv is obtained from the following equation:

$$Pv=Pe+(Pc+180)+240 \text{ (rad)}$$

where Pv=Pv−360 when Pv≧360. The microcomputer 60 then reads a sinusoidal waveform voltage rate Ds from energizing waveform data corresponding to the obtained voltage phase Pv in the same manner as described above, as shown in FIG. 15. The energizing signal Dv is obtained from the following equation:

$$Dv=Ds\times(Vc/256)+128.$$

The microcomputer 60 then advances to step B80 to obtain a phase W energizing signal Dw by calculation and delivers the signal. The phase W voltage phase Pv is obtained from the following equation:

$$Pv=Pe+(Pc+180)+120 \text{ (rad)}$$

where Pv=Pv−360 when Pv≧360.

The microcomputer 60 then reads a sinusoidal waveform voltage rate DS from energizing waveform data corresponding to the obtained voltage phase Pv in the same manner as described above, as shown in FIG. 15. The energizing signal Dw is obtained from the following equation:

$$Dw=Ds\times(Vc/256)+128.$$

The microcomputer 60 then advances to step B90 to deliver the energizing ON signal DO after the phase energizing signals Du, Dv and Dw have been calculated and delivered.

The second interrupt process is executed as described above so that the energization of the motor 20 is started. In the positioning mode, the phase command is "−90 degrees" as shown in FIGS. 12E. Accordingly, torque is produced FIG. 14. Furthermore, since the voltage command Vc is increased from 0, the produced torque is gradually increased. Consequently, vibration is not produced. However, rotation of the rotatable tub 4 is stopped.

The energizing signals Du, Dv and Dw are serving as positioning energizing signals. Accordingly, the above-described steps D70 and D80 of FIG. 9 and steps B30 to B80 of FIG. 11 constitute positioning energizing signal forming means.

When the drive command in FIGS. 12A to 12E is changed to "111" by the wash operation program, the operation mode is changed to the NORMAL ROTATION mode. The microcomputer 60 advances from step D15 to step D120. The microcomputer 60 inputs the position signals Ha and Hb at step D120 and further advances to step D130 to determine the electrical angle Pe according to the initial electrical angle table of FIG. 14. In this case, the initial electrical angle table is used since the motor 20 is not rotated yet. The microcomputer 60 then sets the rotation flag at step D140. Thereafter, the microcomputer 60 advances to step D150 to set the first timer 61 and further to step D160 to initialize and start the second timer 62. The microcomputer 60 then permits the first and second interrupt process at step D170.

The second interrupt process is executed in the same manner as in the above-described positioning mode. Since the rotation flag has been set at step D140 of FIG. 9, the microcomputer 60 determines in the affirmative (YES at step B10 of FIG. 11), advancing to step B20 where the electrical angle Pe is increased for every increase period (i.e., one degree). That is, the electrical angle Pe is increased by one degree as Pe=Pe+1. However, Pe=Pe−360 when Pe≧360. Thereafter, steps B30 to B90 are sequentially executed. In this case, the voltage command Vc and the phase command Pc both shown in FIGS. 12D and 12E respectively are also increased with the increase in the electrical angle Pe. Accordingly, the energizing signals Du, Dv and Dw according to the increase electrical angle Pe, voltage command Vc and phase command Pc are delivered to the PWM circuit 58. Consequently, the drive circuitry 57 delivers the drive signals according to the energizing signals Du, Dv and Dw to turn on and off the switching elements 54a to 54f. The voltage for obtaining the sinusoidal current is supplied to the phase windings 26u, 26v and 26w of the brushless motor 20 as shown in FIG. 16H, so that an induced voltage or a sinusoidal winding current having a predetermined phase relative to the rotor rotation position flows. As a result, the rotor 27 is gradually rotated forward. The rotation of the rotor changes the position signals Ha and Hb of the Hall ICs 31a and 31b.

The first interrupt process will now be described with reference to FIG. 10. The first interrupt process permitted at step D170 of FIG. 9 is initiated on the basis of the changes in the position signals Ha and Hb. The microcomputer 60 inputs the position signals Ha and Hb at step A10 and further inputs the time data DT1 from the first timer 61 at step A20. The microcomputer 60 stores the position signals Ha and Hb as sensor changing period Ts (Ha and Hb). The first timer 61 is reset and restarted at step A30. Thus, the time data is read from the first timer 61 every time the position signals Ha and Hb change, and the first timer 61 is restarted after reset. Accordingly, the first timer 61 serves as changing period measuring means for measuring the changing periods Ts (Ha and Hb) of the position signals.

Furthermore, the changing period Ts (Ha and Hb) is stored at step A20. A doubled changing period Ts is stored only at a first time. The reason for this is that the motor 20 is started at the middle point as described above and a time between the middle point and the changing point of each of the first position signals Ha and Hb is one half of a usual time. At step A40, the microcomputer 60 determines whether the rotational speed is below 200 rpm. The rotational speed takes the initial value of 0 and is calculated at step A80.

The agitator 5 is rotated at low speeds in the wash operation, and the speed of the motor 20 does not exceed 200 rpm. Accordingly, the microcomputer 60 advances to step A50 to obtain an electrical angle period Td which is time data corresponding to one degree of electrical angle. The electrical angle period Td is obtained from the following equation:

$$Td=Ts/90$$

where Ts is a sensor changing period stored at step A20.

The microcomputer 60 then sets the electrical angle period Td at the second timer 62 as the time data TD2. As a result, the second timer 62 is operated at one degree of electrical angle period Td, and the second interrupt process is executed every time data TD2 or every electrical angle of one degree. The microcomputer 60 then advances to step A70 to set the electrical angle Pe according to the rotation electrical angle data table of FIG. 14. The microcomputer 60 further advances to step A80 to calculate the rotational speed from the following equation:

$$\text{Rotational speed}=60/(4Ts\times P)$$

where P is the number of paired poles in the rotor magnet 30 of the brushless motor 20. The steps A10 to A70 in FIG. 10 and steps B20 to B80 in FIG. 11 constitute rotation energizing signal forming elements and first energizing signal forming element. The processes at steps A10 to A40, A90, A100, A60, A70 and steps B20 to B80 of FIG. 11 are executed when the microcomputer 60 determines at step A40 of FIG. 10 that the speed is at or above 200 rpm. These steps constitute second energizing signal forming element of the rotation energizing signal forming element.

The operation accompanied by the above-described operation of the microcomputer 60 will now be described with reference to FIGS. 15 to 16I. Assume now that the position of the rotor 27 of the brushless motor 20 is shown by the phase U, V and W induced voltages Ue, Ve and We in FIG. 13. As shown, the position signal Ha of the Hall IC 31a changes from the low level to the high level at a rotor position corresponding to the zero-degree position of the phase U induced voltage Ue. The position signal Ha changes from the high level to the low level at a rotor position corresponding to the 180-degree position of the phase U induced voltage Ue. The other position signal Hb of the Hall IC 31b changes with a phase shift of the electrical angle of π/2 (rad) or 90 degrees. The first interrupt process is executed at the changing points of the position signals Ha and Hb, as shown in FIG. 16B. The first timer 61 measures the changing period Ts and the microcomputer 60 calculates the period Td corresponding to the electrical angle of one degree. The period Td is set in the second timer 62 as time data Td. As shown in FIG. 16C, the second interrupt process is executed every time the second timer 62 counts up the time data Td. That is, the second interrupt process is executed for every one degree of electrical angle.

The electrical angle Pe corresponding to the rotor position of the motor 20 is determined by the second interrupt process as shown in FIG. 16D. The voltage phase Pv is determined according to the phase command Pc as shown in FIG. 16E. Signals with three-phase sinusoidal wave data, for example, substantially sinusoidal energizing signals Du, Dv and Dw are formed on the basis of the voltage phase Pv and the voltage command Vc. These energizing signals Du, Dv and Dw are supplied to the PWM circuit 58 of the driving means 59 to be converted to drive signals Vup and Vuv for the switching elements 54a to 54f. The drive signals are supplied via the drive circuitry 57 to the switching elements 54a to 54f to thereby on-off control the switching elements. In this case, a phase U inverter output voltage is as shown in FIG. 6H, and the phase U winding current is substantially sinusoidal as shown in FIG. 16I. Phase V and W winding currents are rendered substantially sinusoidal in the same manner as described above. When the phase command Pc is "30 degrees," the winding currents are in phase with the phase induced voltages respectively. Consequently, a power factor can be improved.

As the result of the above-described operation of the microcomputer 60, the output voltages are supplied to the phase windings 26u, 26v and 26w in phases corresponding to them respectively. As shown in FIGS. 12A to 12E, the rotor 27 is positioned during the positioning mode in which the phase command Pc is −90 degrees. The rotor 27 is rotated in the normal direction during the NORMAL ROTATION mode in which the phase command Pc and the voltage command Vc are increased. The rotor 27 is reversed when the operation mode changes via the positioning mode to the REVERSE ROTATION mode. In the REVERSE ROTATION mode, the electrical angle is determined by an electrical angle data table for reverse rotation in the same manner as described with reference to the electrical angle data table of FIG. 14. In the above-described positioning mode, a suitable one or more of the three-phase windings are energized and the rotor is held at a predetermined position.

The currents flowing through the windings 26u, 26v and 26w are substantially sinusoidal during normal and reverse rotations of the brushless motor 20. Consequently, torque variations and accordingly the vibration are reduced. The rotor is positioned at the predetermined position when the normal and reverse rotations are initiated. Accordingly, since the sinusoidal wave energization is executed from the starting of the motor, vibration produced during the rise of the motor speed is reduced as compared with the rectangular wave energization. Furthermore, since the windings 26u, 26v and 26w are normally being energized at the times of repetition of the positioning, normal rotation, positioning, and reverse rotation, the vibration is also reduced.

Control of the microcomputer 60 for the dehydration operation will now be described. The dehydration operation control starts when the microcomputer 60 determines in the affirmative at step M130 of the main program in FIG. 8. At step M140, the drain valve motor 9 is energized so that the drain valve 7 is opened to discharge the water in the rotatable tub 4. The draining is continued on the basis of the detection signal delivered from the water level sensor 73 until the rotatable tub 4 is drained (step M150).

When the drain valve motor 9 is energized, the lower convex portion 33e of the change-over lever 33 engages the convex portions 28d on the upper face of the rotor housing 28 when the change-over lever 33 is rotated downward, as shown in FIG. 7. Consequently, the tub shaft 12 is co-rotated with the motor rotor 27 and the agitator shaft 14. In this condition, the tub shaft 12, the rotatable tub 4, the agitator shaft 14 and the agitator 5 are directly driven by the brushless motor 20. Upon completion of the draining of the rotatable tub 4, the microcomputer 60 advances to step M160 to select and set one of a plurality of dehydration operation courses. The microcomputer 60 sequentially executes steps M170, M180 and M190 to form an operation pattern (operation command) for the motor 20. In this case, ROM 60a stores a plurality of dehydration operation patterns. The microcomputer 60 reads one of the dehydration operation patterns corresponding to the course selected at step M160, thereby forming the dehydration operation pattern.

FIGS. 17A to 17E show an example of the dehydration operation pattern. The dehydration operation pattern is constituted by a drive command comprising 3 bit data, a voltage command Vc comprising 8 bit data, and a phase command Pc comprising 9 bit data as the washing operation pattern shown in FIGS. 12A to 12E. The dehydration operation pattern includes a positioning mode and a normal rotation mode. Changing patterns of the drive command, voltage command Vc, phase command Pc in the dehydration operation pattern differs from those of the commands in the washing operation pattern. However, the microcomputer 60 also executes the main program of FIG. 8, the motor driving main processing of FIG. 9, the first interrupt process of FIG. 10 and the second interrupt process of FIG. 11 as in the washing operation pattern. Accordingly, when the operation mode is changed via the positioning mode to the normal rotation mode, the motor 20 starts and its speed is increased. The speed of the motor is determined at step A40 of the first interrupt process (FIG. 10) executed every 20 msec. When the rotational speed of the brushless motor 20 is at or above 200 rpm, the microcomputer 60 determines in the negative (NO at step A40), advancing to step A90. The microcomputer 60 determines whether the position signals Ha and Hb are in the mode of "1, 0." Only when signals are in the mode of "1, 0," the microcomputer 60 advances to step A100 to calculate an electrical angle period Td. At each of the steps A50 and A100, the period Td of one degree of electrical angle is calculated. However, the equations used for the calculation are different from each other. At step A100, $Td=(Ts(0, 0)+Ts(0, 1)+Ts(1, 0)+Ts(1, 1))/360$ where the position sensor period Ts is a period of previous four position signals Ha and Hb for every electrical angle of 90 degrees stored at step A20. More specifically, the period Ts corresponds to a previous unit rotation angle of the rotor or a previous unit electrical angle period. The period Td of one degree of electrical angle is obtained from the previous unit electrical angle period. At step A50, the period Td of one degree of electrical angle is obtained from a previous quarter electrical angle period. Thereafter, the microcomputer 60 advances to step A60.

The manner of obtaining the period Td at step A100 differs from that in the washing operation pattern only in the case where the speed is below 200 rpm. Accordingly, the substantially sinusoidal energizing signals Du, Dv and Dw are formed at steps B60, B70 and B80 of FIG. 11. Thus, steps A10, A20, A30, A60, A70, A100 of FIG. 10 and steps B20 to B80 of FIG. 11 constitute rotation energizing signal forming element and second energizing signal forming element.

FIGS. 18A to 18H show the case where the rotational speed is at or above 200 rpm. As shown, the period Td of the second timer 62 is determined in synchronization with the change of the position signal Ha and Hb to "1, 0" or depends upon only the position signal Ha of the one Hall IC 31a. Thus, the period of electrical angle (4Ts) is measured on the basis of only the position signal Ha from the Hall IC 31a, and then, the period Td corresponding to one degree of electrical angle is obtained. Consequently, the vibration can be reduced in the high speed rotation. More specifically, when the brushless motor is controlled using the two position signals Ha and Hb from the plurality of Hall ICs 31a and 31b, the energization of the brushless motor can be controlled in synchronization with each position of the rotor. Particularly, desired rotation control can be achieved particularly in a period of low speed rotation or in periods of acceleration and deceleration. However, a plurality of position signals used in the control sometimes becomes nonuniform when an accuracy in the mounting positions of the rotor position detecting elements are low or when motor fluxes are nonuniform. The nonuniformity in the position signals sometimes produces a cogging torque when the control is switched at a switching time of the position signals. In the above-described embodiment, however, one period of electrical angle (4Ts) is measured on the basis of only the position signal Ha of the hall IC 31a in the dehydration operation, particularly when the motor is rotated at high speeds or when the rotation is stable. The period Td corresponding to one degree of electrical angle is obtained. Consequently, the vibration can be reduced.

When the dehydrating time set according to the dehydration operation course has expired in the main process of FIG. 8, the microcomputer 60 determines completion of the dehydrating operation at step M200, advancing to step M230 for execution of braking. In the braking process, all the energizing signals Du, Dv and Dw are rendered zero, so that the driving means 59 turns off and then on the switching elements 54a to 54f of the inverter main circuit 47, whereby the windings 26u, 26v and 26w are short-circuited. Consequently, the rotor 27 is braked. The braking process is executed for a predetermined time. Thereafter, the microcomputer 60 delivers the motor stop command at step M240 or turns the signal D0 to the low level. The brushless motor 20 is deenergized and stopped.

In the above-described washing machine, the wash and dehydration operation as described above are combined together so that wash, rinse and dehydration steps of the set washing course are executed.

According to the foregoing embodiment, in the wash operation, the change-over lever 33 of the clutch 32 is rotated upward so that the agitator shaft 14 and the agitator 5 are directly rotated repeatedly alternately in the normal and reverse directions by the rotor 27 of the brushless motor 20. In the dehydration operation, the change-over lever 33 is rotated downward so that the agitator shaft 14, tub shaft 12, agitator 5 and rotatable tub 4 are directly rotated in the normal direction at high speeds. Thus, the direct drive structure eliminates a belt transmission mechanism and a gear reduction mechanism. Consequently, the weight and size of the washing machine can be reduced, and the noise due to its operation can be reduced.

The sinusoidal energizing signals Du, Dv and Dw are formed on the basis of the position signals Ha and Hb delivered by the Hall ICs 31a and 31b. The brushless motor 20 is energized on the basis of the energizing signals Du, Dv and Dw. Consequently, since the torque variations in the motor 20 are reduced, the vibration and noise due to the operation thereof can be reduced.

The number of the Hall ICs is smaller than that of the winding phases. In the foregoing embodiment, the number of the phases of the windings 26 is three and two Hall ICs are provided. Thus, the number of the Hall ICs can be reduced as compared with the case where the number of Hall ICs is equal to that of the winding phases. Consequently, a motor circuit board can be rendered small-sized and the wiring for the Hall ICs can be simplified. Accordingly, the manufacturing efficiency can be improved and the manufacturing cost can be reduced.

The quarter electrical angle period Ts is measured for every changing point of the position signals Ha and Hb delivered from the plurality of Hall ICs 31a and 31b when the motor is rotated at low speeds or accelerated and decelerated. The period Td corresponding to one degree of electrical angle is obtained from the period Ts. Consequently, the energization of the motor can be controlled in synchronization with the respective positions of the rotor 27 and accordingly, a desired rotational control can be provided.

The electrical angle period is measured on the basis of only the position signal Ha of the Hall IC 31a in the dehydration operation, particularly in the high speed rotation or stable speed rotation. The period Td is obtained from the measured electrical angle period. Consequently, the vibration can be reduced.

The microcomputer 60 selects the case where the position signals Ha and Hb from the plurality of Hall ICs 31a and 31b are used or the case where only the position signal Ha is used. Consequently, the vibration can desirably be reduced according to the operating condition of the washing machine.

The period Ts in which each of the position signals Ha and Hb changes is measured. The voltage phase Pv is determined to have a resolution (one degree of electrical angle) higher than an electrical angle corresponding to the changing period Ts. The voltage rate Ds according to the sinusoidal wave corresponding to the voltage phase Pv is read from ROM 60a serving as the voltage rate storing means. Substantially sinusoidal energizing signals Du, Dv and Dw are formed on the basis of the voltage phase Pv and the voltage rate Ds. Consequently, energizing signals more approximate to the sinusoidal waveform can be formed and accordingly, the vibration can further be reduced.

Two rotor position detecting means or Hall ICs are provided and the position signals delivered from the respective Hall ICs change for every π/2 (rad) of the rotor phase or 90 degrees. Accordingly, the changing point of the position signal is obtained at equal pitches obtained by dividing the electrical angle 2π of the rotor phase into four equal parts. Consequently, the forming processes of the energizing signals Du, Dv and Dw can be simplified as compared with the case where the changing points of the position signals are obtained at unequal pitches.

The energizing signals Du, Dv and Dw are formed as phase positioning energizing signals when the motor 20 is started and is switched between the normal and reverse rotations. Consequently, the rotor 27 can be positioned at the predetermined position at the time of rise of the motor speed from the stopped state, that is, when the motor starts or is switched between the normal and reverse rotations. Accordingly, the sinusoidal waveform energization can be executed from the time of rise of the motor speed. This can further reduce the vibration as compared with the case of rectangular wave energization.

The positioning energizing signals can also be formed so as to have the voltage phase with a resolution higher than the electrical angle corresponding to the changing period of each of the position signals Ha and Hb. Particularly in the foregoing embodiment, the positioning energizing signals are first formed and thereafter, the rotation energizing signals are formed. Consequently, the vibration can be reduced from the time of starting of the motor.

The positioning energizing signals are formed so that the rotor 27 is positioned at the middle point between the positions specified by the Hall ICs 31a and 31b. Consequently, since an amount of movement of the rotor 27 is not increased when it is positioned, the motor starting time can be prevented from being increased. More specifically, the stop position of the rotor is unfixed, that is, the rotor stops at any point between the positions specified by the rotor position detecting means. Accordingly, if the rotor should be positioned at a point between the specified positions other than the middle point, the rotor stop position would be nearer to or further away from the point. In the foregoing embodiment, however, the rotor 27 is positioned at the middle point between the specified positions. Consequently, the above-described drawback can be overcome.

In modified forms, the number of the rotor position detecting elements may be one, and the position signal may be changed for every electrical angle of 2π (rad) of the rotor phase. In this arrangement, the energizing signal according to the electrical angle of the rotor phase can be formed in synchronization with the rise or fall of the position signal. This arrangement is suitable particularly for the case where the energizing signal is formed by the second energizing signal forming means. Consequently, this arrangement can reduce number of rotor position detecting elements and is suitable for the mass production.

Photosensors may be used for the rotor position detecting element, instead of the Hall ICs. Furthermore, the electrical angle period Td formed in the first interrupt process is determined in the unit of electrical angle of one degree, and the electrical angle Pe is also determined in the unit of electrical angle of one degree in the second interrupt process. However, the electrical angle can be set according to the throughput of the microcomputer. The electrical angle may further be changed on the basis of a rotational speed during rotation. Furthermore, the voltage command Vc and the phase command Pc shown in FIGS. 12D, 12E, 17D and 17E may be curvilinear.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A washing machine comprising:

an outer tub;

a rotatable tub rotatably mounted in the outer tub;

an agitator rotatably mounted in the rotatable tub;

a brushless motor for direct driving at least one of the rotatable tub and the agitator, the brushless motor including windings of a plurality of phases and a rotor;

a plurality of rotor position detecting elements to detect a rotational position of the rotor by at least one of the plurality of rotor position detecting elements, the number rotor position detecting elements being less than the number of phases;

an energizing signal forming element to generate a sinusoidal energizing signal for each of the plurality of phases based on the detected rotational position of the rotor; and a driving element to energize the windings of the plurality of phases based on the generated energizing signals.

2. A washing machine comprising:

an outer tub;

a rotatable tub rotatably mounted in the outer tub;

an agitator rotatably mounted in the rotatable tub;

a brushless motor for direct driving at least one of the rotatable tub and the agitator, the brushless motor including windings of a plurality of phases and a rotor;

a plurality of rotor position detecting elements to detect a rotational position of the rotor;

a first energizing signal forming element to generate a substantially sinusoidal energizing signal for each of the plurality of phases based on the rotational position of the rotor detected by the plurality of rotor position detecting elements;

a second energizing signal forming element to generate a sinusoidal energizing signal for each of the plurality of phases based on the rotational position of the rotor detected by one of the plurality of rotor position detecting element;

a selector to select the energizing signals of the first energizing signal forming element or of the second energizing signal forming element; and a driving element to energize the windings of the plurality of phases based on the selected energizing signals.

3. The washing machine according to claim 1, wherein the energizing signal forming element includes:

changing period measuring element to measure a period between changes in magnitude in the signals that represent the detected position of the rotor by the plurality of rotor position detecting element;

a voltage phase determining element to determine a voltage phase based on the measured period and the detected position of the rotor;

a voltage rate storing element to store a voltage rate of the voltage phase; and a forming element to generate substantially sinusoidal energizing signals for each of the plurality of phases based on the voltage phase and the voltage rate.

4. The washing machine according to claim 2, wherein the first and the second energizing signal forming elements include:

a changing period measuring element to measure a period between changes in magnitude in the signals that represent the detected position of the rotor by the plurality of rotor position detecting elements;

a voltage phase determining element to determine a voltage phase based on the measured period and the detected position of the rotor;

a voltage rate storing element to store a voltage rate of the voltage phase; and a forming element to generate substantially sinusoidal energizing signals for each of the plurality of phases based on the voltage phase and the voltage rate.

5. The washing machine according to claim 3, further comprises an electrical angle determining element to determine an increase period for every $\pi/n$, wherein n is the number of the rotor position detecting elements, and the increase period is a unit phase angle added to the voltage phase, predetermined data corresponding to the position of the rotor, the data written in synchronization with changes of the position of the rotor, and a phase command determining element to determine a phase command of the voltage phase, wherein the voltage phase is the sum of a value determined by the electrical angle determining element and a value determined by the phase command determining element.

6. The washing machine according to claim 4, further comprises an electrical angle determining element to determine an increase period for every $\pi/n$, wherein n is the number of the rotor position detecting elements, and the increase period is a unit phase angle added to the voltage phase, predetermined data corresponding to the position of the rotor the data written in synchronization with changes of the position of the rotor, and a phase command determining element to determine a phase command of the voltage phase, wherein the voltage phase is the sum of a value determined by the electrical angle determining element and a value determined by the phase command determining element.

7. The washing machine according to claim 1, wherein the number of the rotor position detecting elements is two, and wherein the detected rotational position by the two rotor position detecting elements change for every rotational angle of the rotor corresponding to $\pi/2$ (rad).

8. The washing machine according to claim 2, wherein the number of the rotor position detecting elements is two, and wherein the detected rotational position by the two rotor position detecting elements change for every rotational angle of the rotor corresponding to $\pi/2$ (rad).

9. The washing machine according to claim 1, wherein the number of the rotor position detecting elements is one, and wherein the detected rotational position by the rotor position detecting element changes for every rotational angle of the rotor corresponding to $2\pi$ (rad).

10. The washing machine according to claim 2, wherein the selector selects the first energizing signal forming element in a wash operation and the second energizing signal forming element in a dehydration operation.

11. The washing machine according to claim 2, wherein the selector selects the first energizing signal forming element when a rotational speed of the brushless motor is below a predetermined value, and the selector selects the second energizing signal forming element when the rotational speed of the brushless motor is at or above the predetermined value.

12. The washing machine according to claim 2, wherein the selector selects the first energizing signal forming element at a time of starting of the brushless motor and at a time of rapid acceleration thereof, and the selector selects the second energizing signal forming element in a state of steady rotation of the brushless motor.

13. A washing machine comprising:

an outer tub;

a rotatable tub rotatably mounted in the outer tub;

an agitator rotatably mounted in the rotatable tub;

a brushless motor for direct driving at least one of the rotatable tub and the agitator, the brushless motor including windings of a plurality of phases and a rotor;

a rotor position detector to detect a rotational position of the rotor;

a rotation energizing signal forming element to generate a rotation energizing signal for each of the plurality of phases of the rotor;

a position energizing signal forming element to generate a position energizing signal for each of the plurality of phases to maintain a predetermined position of the rotor;

a motor operation selector to select the energizing signals of the rotation energizing signal forming element energizing signal forming element; and a driving element to energize the windings of the plurality of phases based on the selected energizing signals.

14. A washing machine comprising:

an outer tub;

a rotatable tub rotatably mounted in the outer tub;

an agitator rotatably mounted in the rotatable tub;

a brushless motor for direct driving at least one of the rotatable tub and the agitator without use of a transmission mechanism, the brushless motor including windings of a plurality of phases and a rotor;

a rotor position detector to detect a rotational position of the rotor;

a phase command forming element to generate a phase command to select a magnitude of a phase difference between a sinusoidal AC voltage applied to the brushless motor and a position of the rotor;

a voltage command forming element to generate a voltage command to select a magnitude of the sinusoidal AC voltage applied to the brushless motor;

a changing period measuring element to measure a period between changes in magnitude in the signal that represents the detected position of the rotor by the rotor position detector;

a voltage phase determining element to determine a voltage phase based on the position of the rotor, the measured period and the phase command;

a voltage rate storing element to store a voltage rate of the voltage phase;

a rotation energizing signal forming element to generate a substantially sinusoidal rotation energizing signal for each of the plurality of phases of the rotor based on the voltage phase, the voltage rate of the voltage phase, and the voltage command;

a position energizing signal forming element to generate a position energizing signal for each of the plurality of phases to maintain a predetermined position of the rotor based on the voltage phase, the voltage rate of the voltage phase, and the voltage command;

a motor operation selector to select the energizing signals of the rotation energizing signal forming element or of the position energizing signal forming element; and a driving element to energize the windings of the plurality of phases based on the selected energizing signals.

15. The washing machine according to claim 13, wherein the motor operation selector selects the rotation energizing signal forming element before the position energizing signal forming element.

16. The washing machine according to claim 14, wherein the motor operation selector selects the rotation energizing signal forming element before the positioning energizing signal forming element.

17. The washing machine according to claim 13, wherein the position energizing signal positions the rotor between positions specified by the rotor position detector, and wherein the motor operation selector selects the position energizing signal forming element before the rotation energizing signal forming element.

18. The washing machine according to claim 14, wherein the position energizing signal positions the rotor between positions specified by the rotor position detector, and wherein the motor operation selector selects the position energizing signal forming element before the rotation energizing signal forming element.

19. The washing machine according to claim 13, wherein the brushless motor is rotated alternately in a normal direction and a reverse direction, and the position energizing signal forming element positions the rotor in a period between the normal rotation and the reverse rotation.

20. The washing machine according to claim 14, wherein the brushless motor is rotated alternately in a normal direction and a reverse direction, and the position energizing signal forming element positions the rotor in a period between the normal rotation and the reverse rotation.

21. The washing machine according to claim 15, wherein the brushless motor is rotated alternately in a normal direction and a reverse direction, and the position energizing signal forming element positions the rotor in a period between the normal rotation and the reverse rotation.

22. The washing machine according to claim 16, wherein the brushless motor is rotated alternately in a normal direction and a reverse direction, and the position energizing signal forming element positions the rotor in a period between the normal rotation and the reverse rotation.

23. The washing machine according to claim 17, wherein the brushless motor is rotated alternately in a normal direction and a reverse direction, and the position energizing signal forming element positions the rotor in a period between the normal rotation and the reverse rotation.

24. The washing machine according to claim 18, wherein the brushless motor is rotated alternately in a normal direction and a reverse direction, and the position energizing signal forming element positions the rotor in a period between the normal rotation and the reverse rotation.

25. The washing machine according to claim 19, wherein the brushless motor is continuously energized by the normal rotation, the reverse rotation and a positioning operation.

26. The washing machine according to claim 20, wherein the brushless motor is continuously energized by the normal rotation, the reverse rotation and a positioning operation.

27. The washing machine according to claim 21, wherein the brushless motor is continuously energized by the normal rotation, the reverse rotation and a positioning operation.

28. The washing machine according to claim 22, wherein the brushless motor is continuously energized by the normal rotation, the reverse rotation and a positioning operation.

29. The washing machine according to claim 23, wherein the brushless motor is continuously energized by the normal rotation, the reverse rotation and a positioning operation.

30. The washing machine according to claim 24, wherein the brushless motor is continuously energized by the normal rotation, the reverse rotation and a positioning operation.

31. The washing machine according to claim 14, wherein the voltage command and the phase command continuously change during operation of the brushless motor.

32. The washing machine according to claim 1, wherein the position of the rotor is represented by a digital signal.

33. The washing machine according to claim 2, wherein the position of the rotor is represented by a digital signal.

34. The washing machine according to claim 13, wherein the position signal of the rotor is represented by a digital signal.

35. The washing machine according to claim 14, wherein the position signal of the rotor is represented by a digital signal.

36. The washing machine according to claim 8, wherein the first energizing signal forming element is based on the rotational position of the rotor detected by the rotor position detecting elements, wherein one of the rotor position detecting elements changes for every rotational angle of the rotor corresponding to $2\pi$ (rad), and wherein the second energizing signal forming element generates a substantially sinusoidal energizing signal for each of the plurality of phases based on the rotational position of the rotor detected by one of the rotor position detecting elements.

* * * * *